No. 618,941. Patented Feb. 7, 1899.
G. W. HILL.
CASH REGISTER.
(Application filed May 27, 1897.)
(No Model.) 10 Sheets—Sheet 1.
FIG_1_
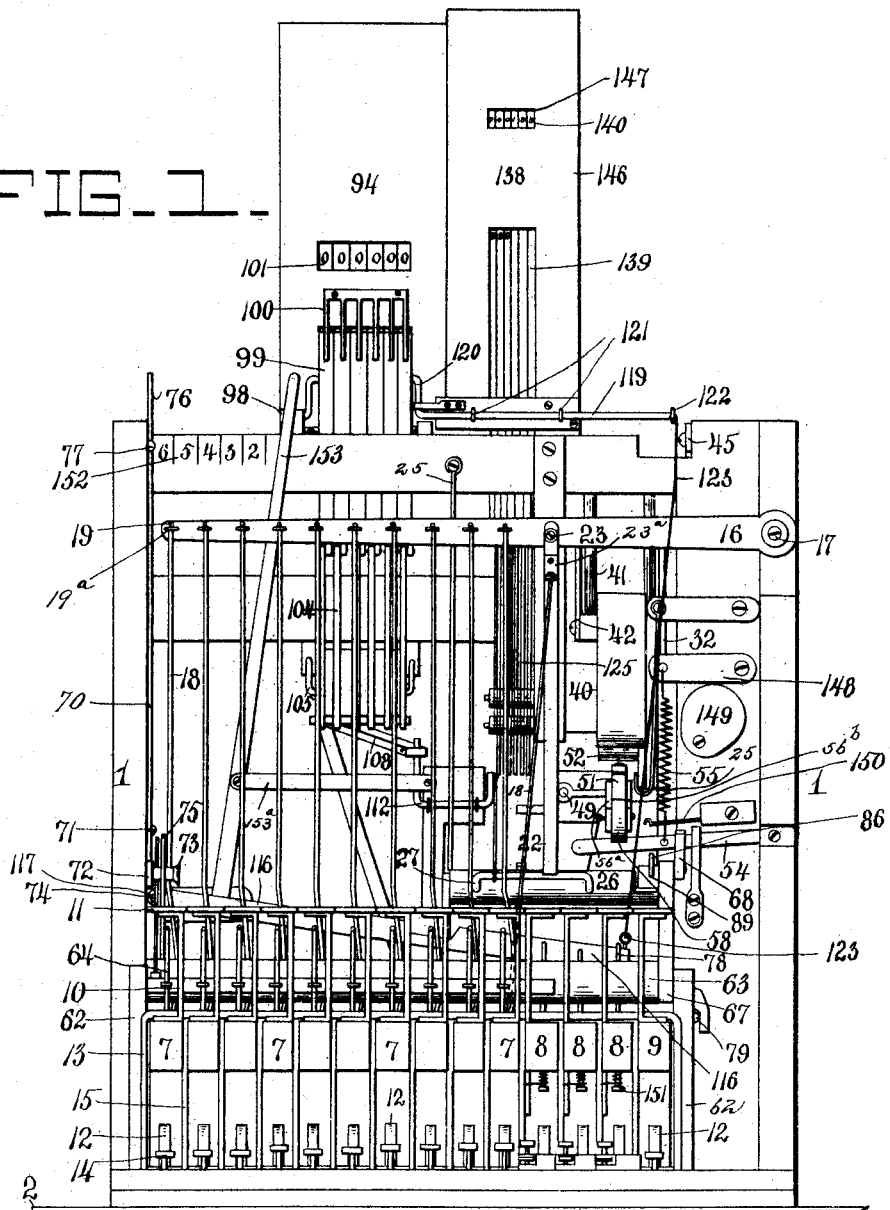
Witnesses
W. E. Allen
James F. Duhamel
Inventor
George Warren Hill.
by John Wedderburn
Attorney

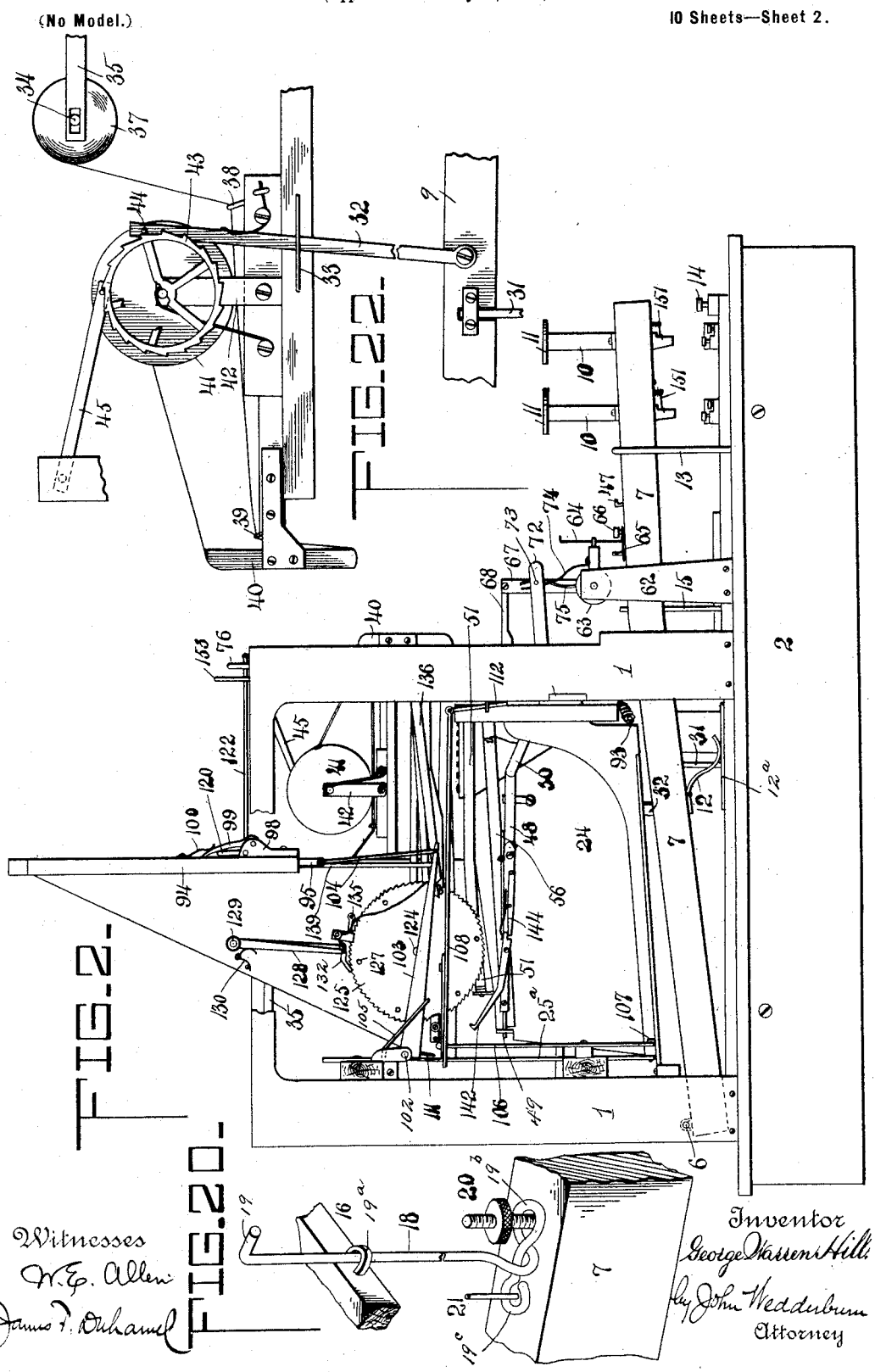

No. 618,941. Patented Feb. 7, 1899.
G. W. HILL.
CASH REGISTER.
(Application filed May 27, 1897.)
(No Model.) 10 Sheets—Sheet 3.
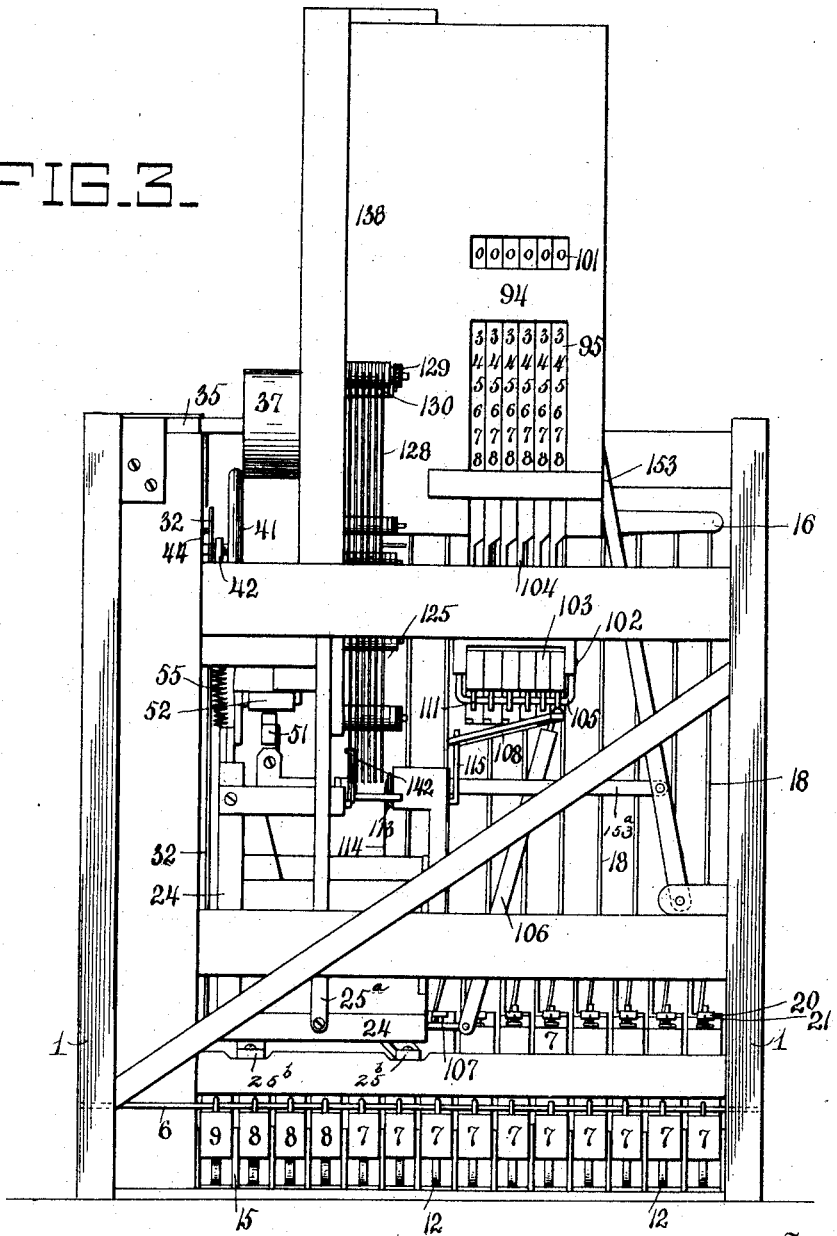
Witnesses
W. E. Allen
James F. Duhamel
Inventor
George Warren Hill,
by John Wedderburn
Attorney No. 618,941. Patented Feb. 7, 1899.
G. W. HILL.
CASH REGISTER.
(Application filed May 27, 1897.)
(No Model.) 10 Sheets—Sheet 4.
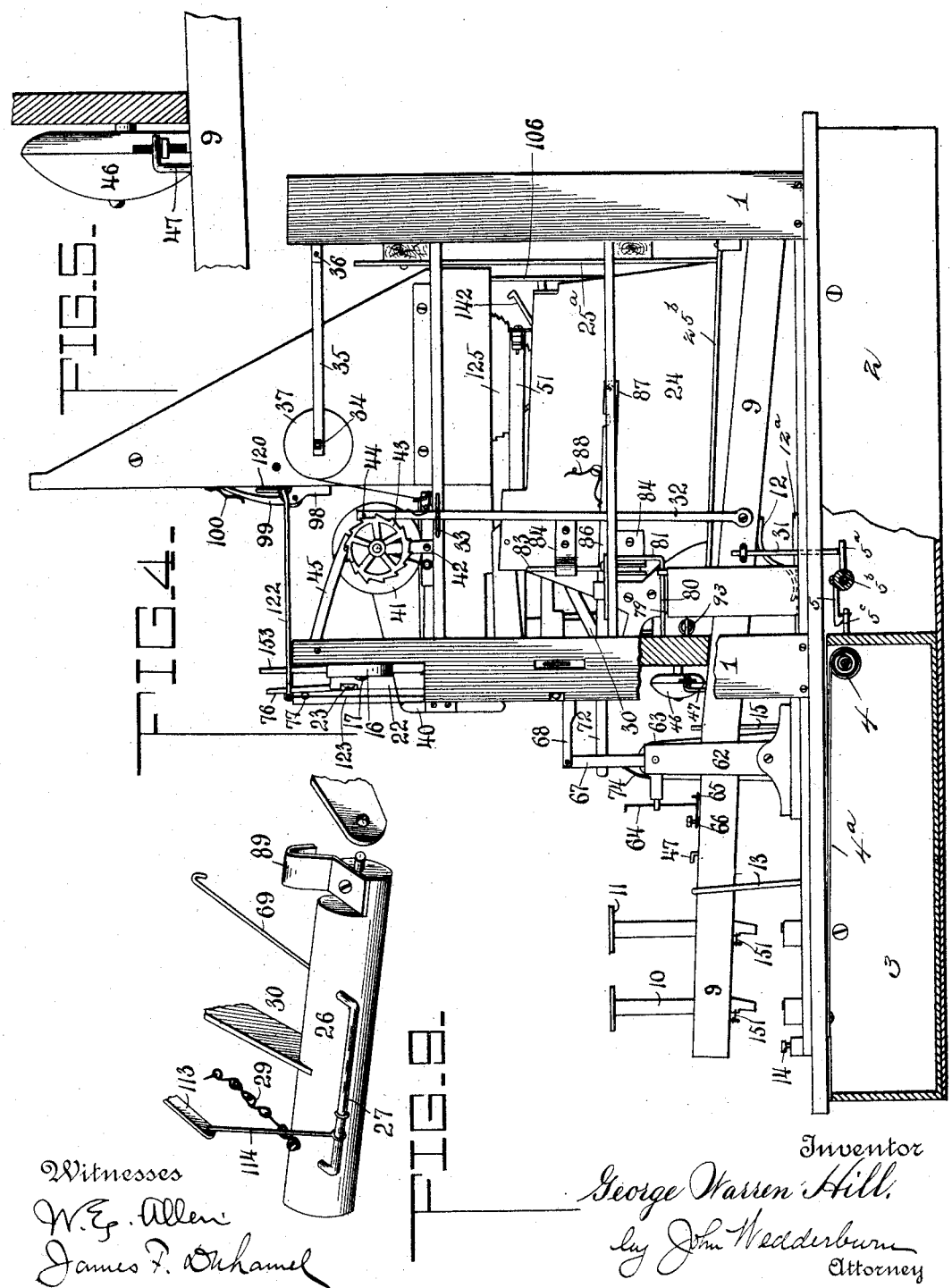

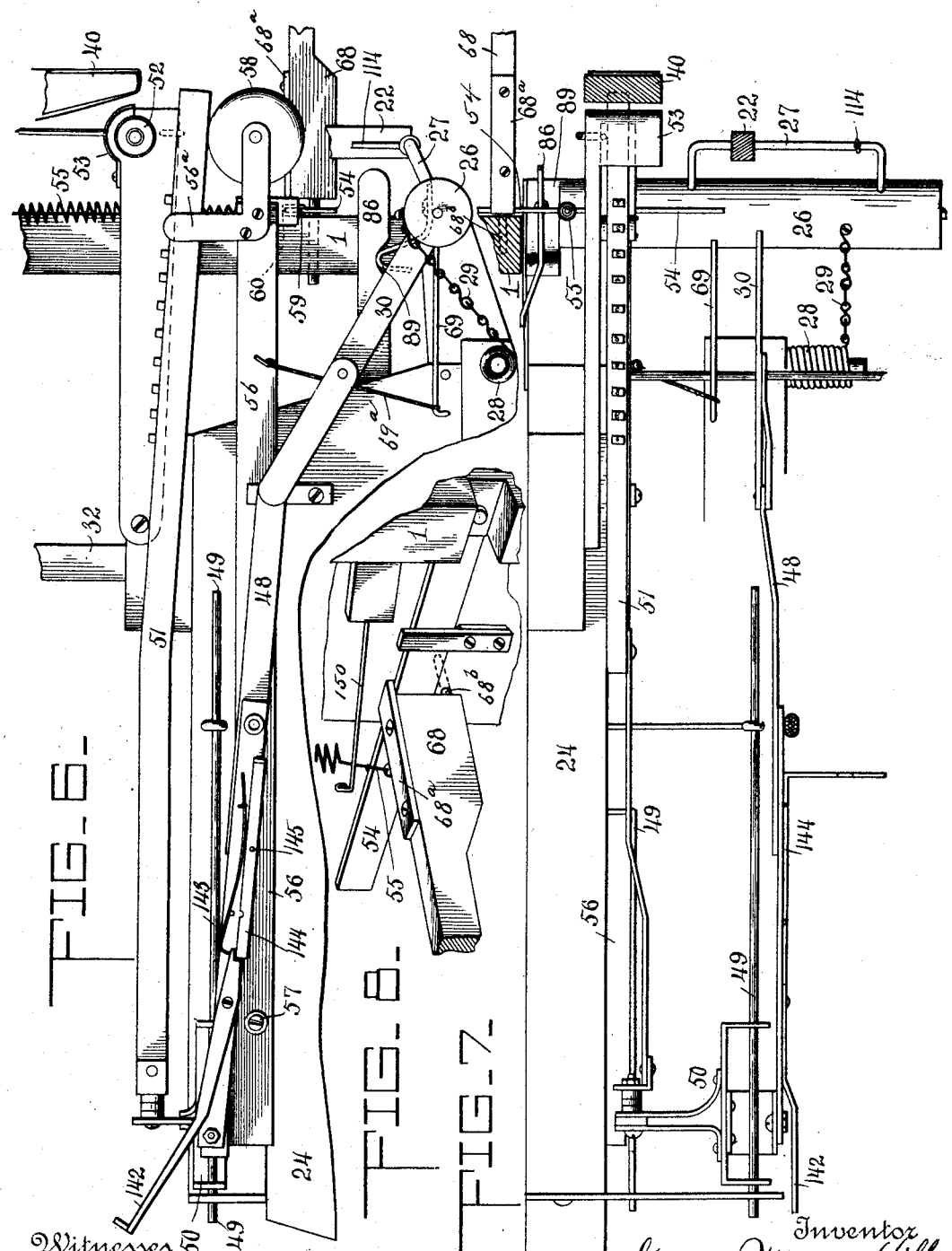

No. 618,941. Patented Feb. 7, 1899.
G. W. HILL.
CASH REGISTER.
(Application filed May 27, 1897.)
(No Model.) 10 Sheets—Sheet 6.
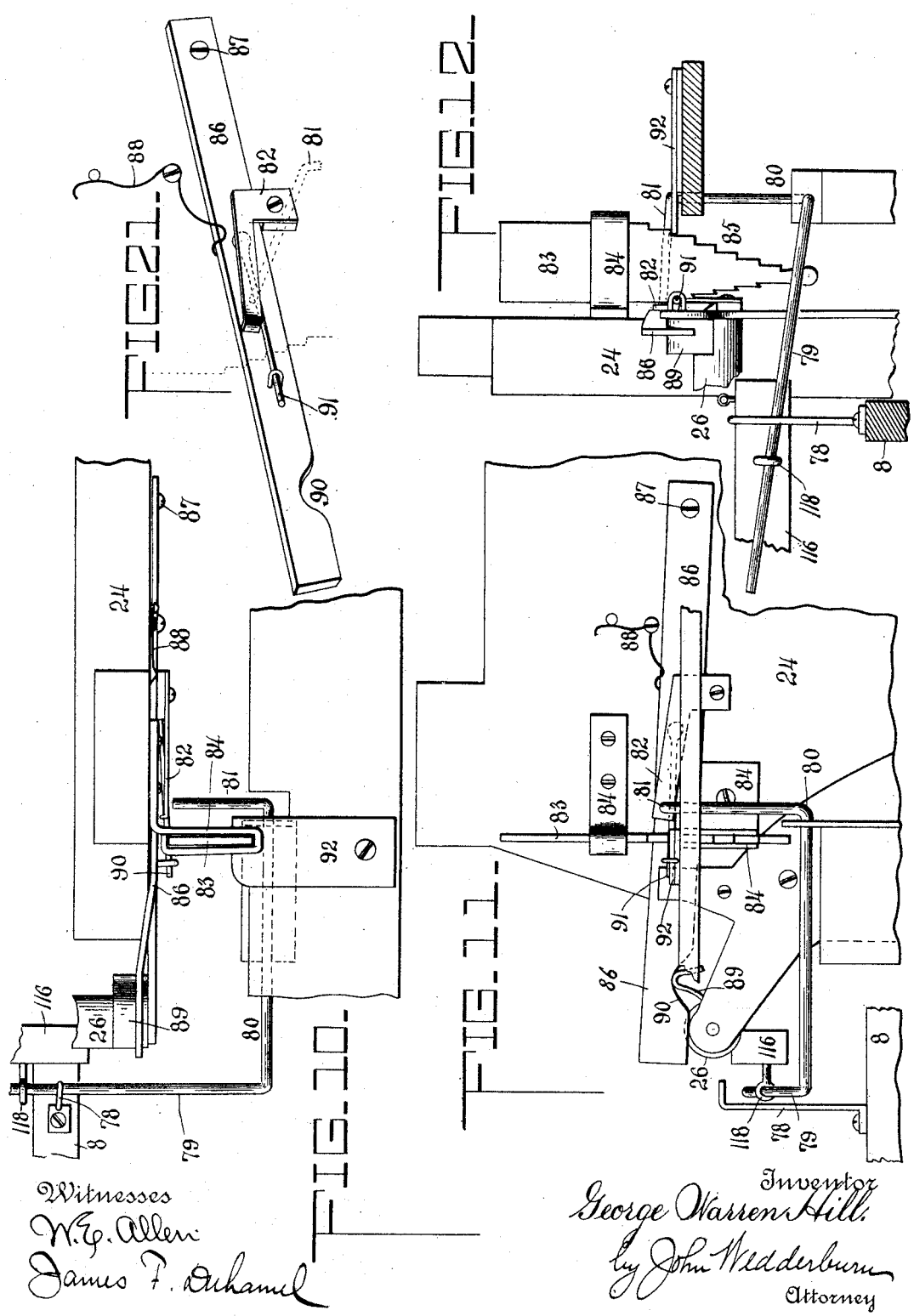
Witnesses
W. E. Allen
James F. Duhamel
Inventor
George Warren Hill,
by John Wedderburn
Attorney No. 618,941. Patented Feb. 7, 1899.
G. W. HILL.
CASH REGISTER.
(Application filed May 27, 1897.)
(No Model.) 10 Sheets—Sheet 7.
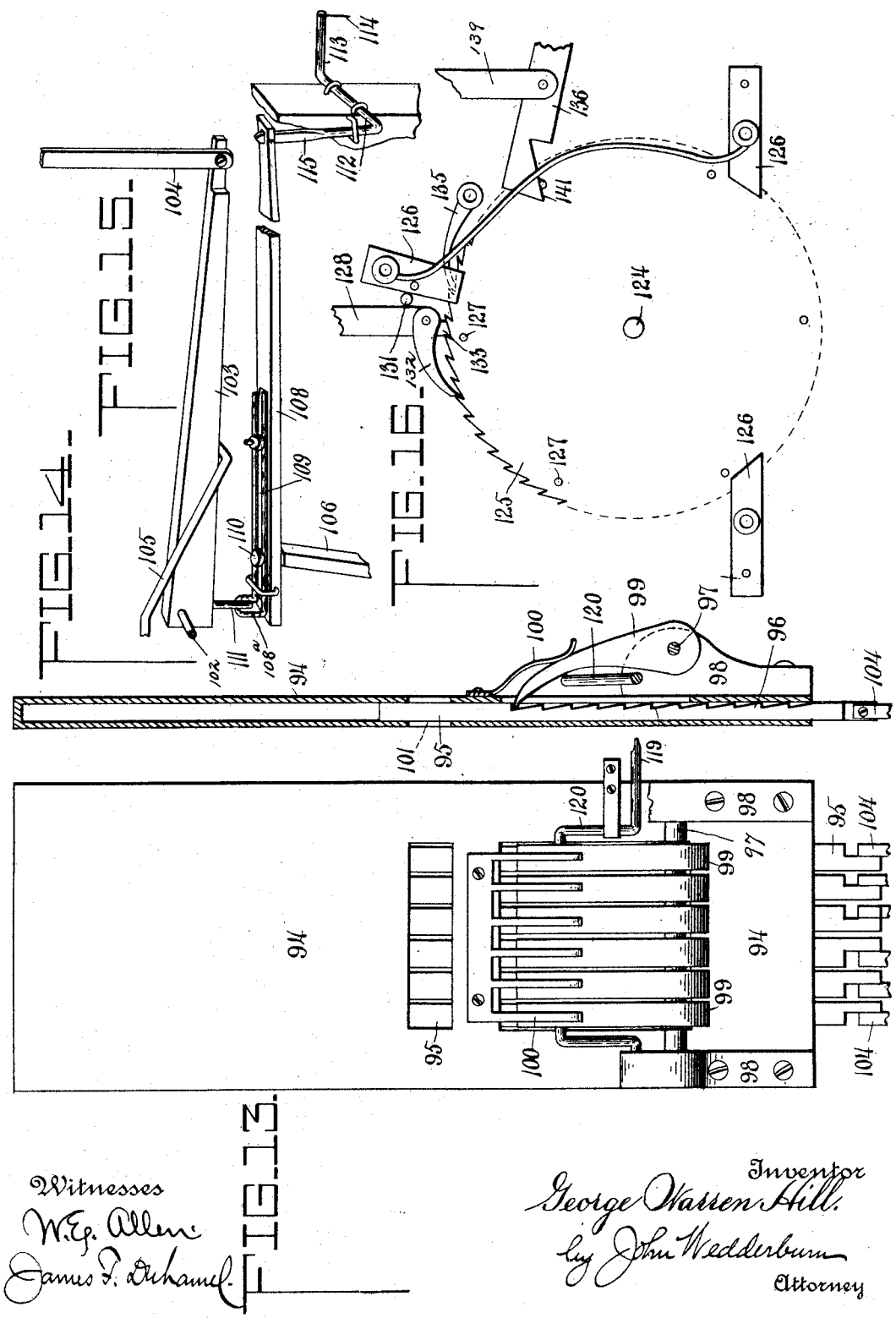

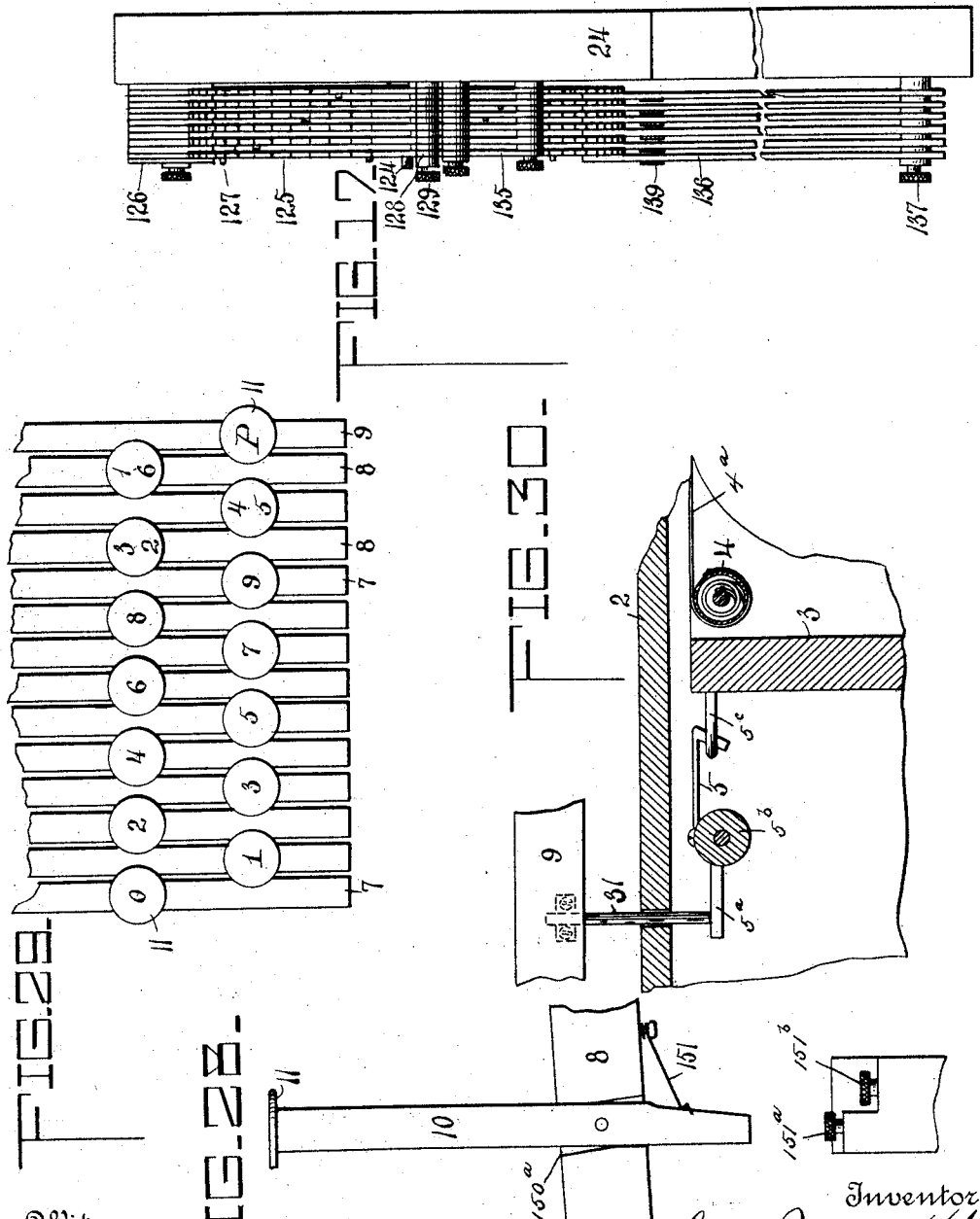

No. 618,941. Patented Feb. 7, 1899.
G. W. HILL.
CASH REGISTER.
(Application filed May 27, 1897.)
(No Model.) 10 Sheets—Sheet 9.
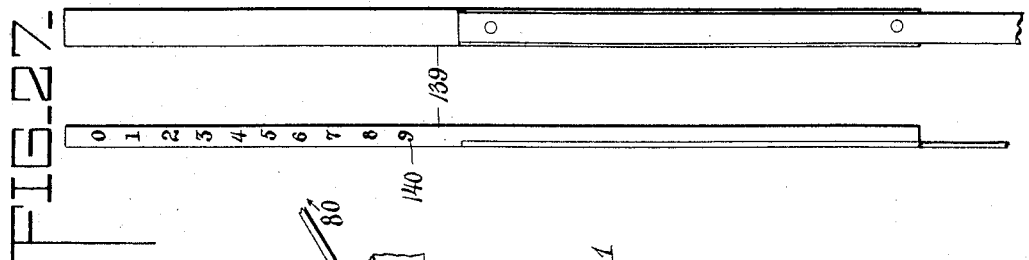
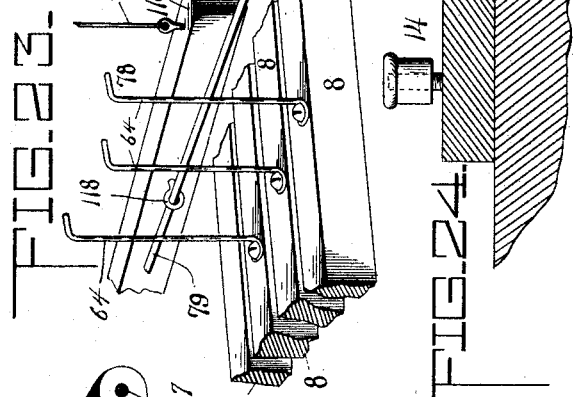
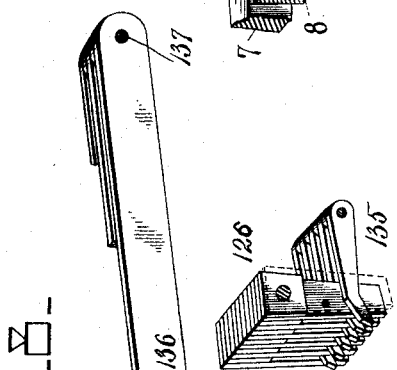
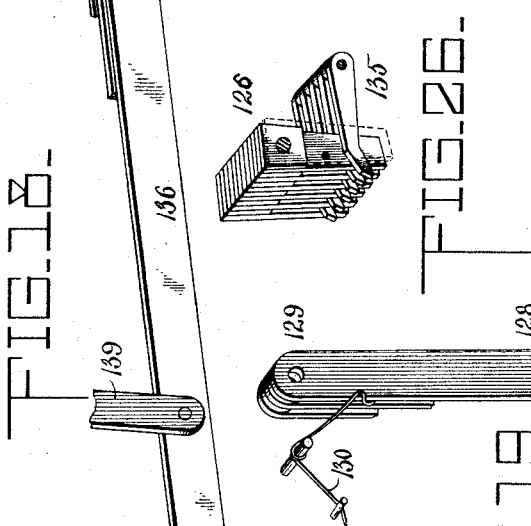
Witnesses
W. E. Allen
James T. Duhamel
Inventor
George Warren Hill.
by John Wedderburn
Attorney
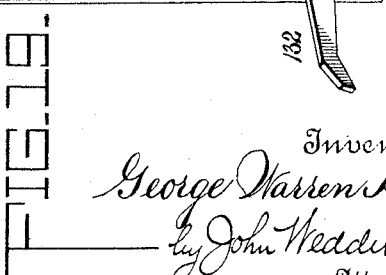
THE NORRIS PETERS CO., PHOTO-LITHO., WASHINGTON, D. C.

No. 618,941. Patented Feb. 7, 1899.
G. W. HILL.
CASH REGISTER.
(Application filed May 27, 1897.)
(No Model.) 10 Sheets—Sheet 10.
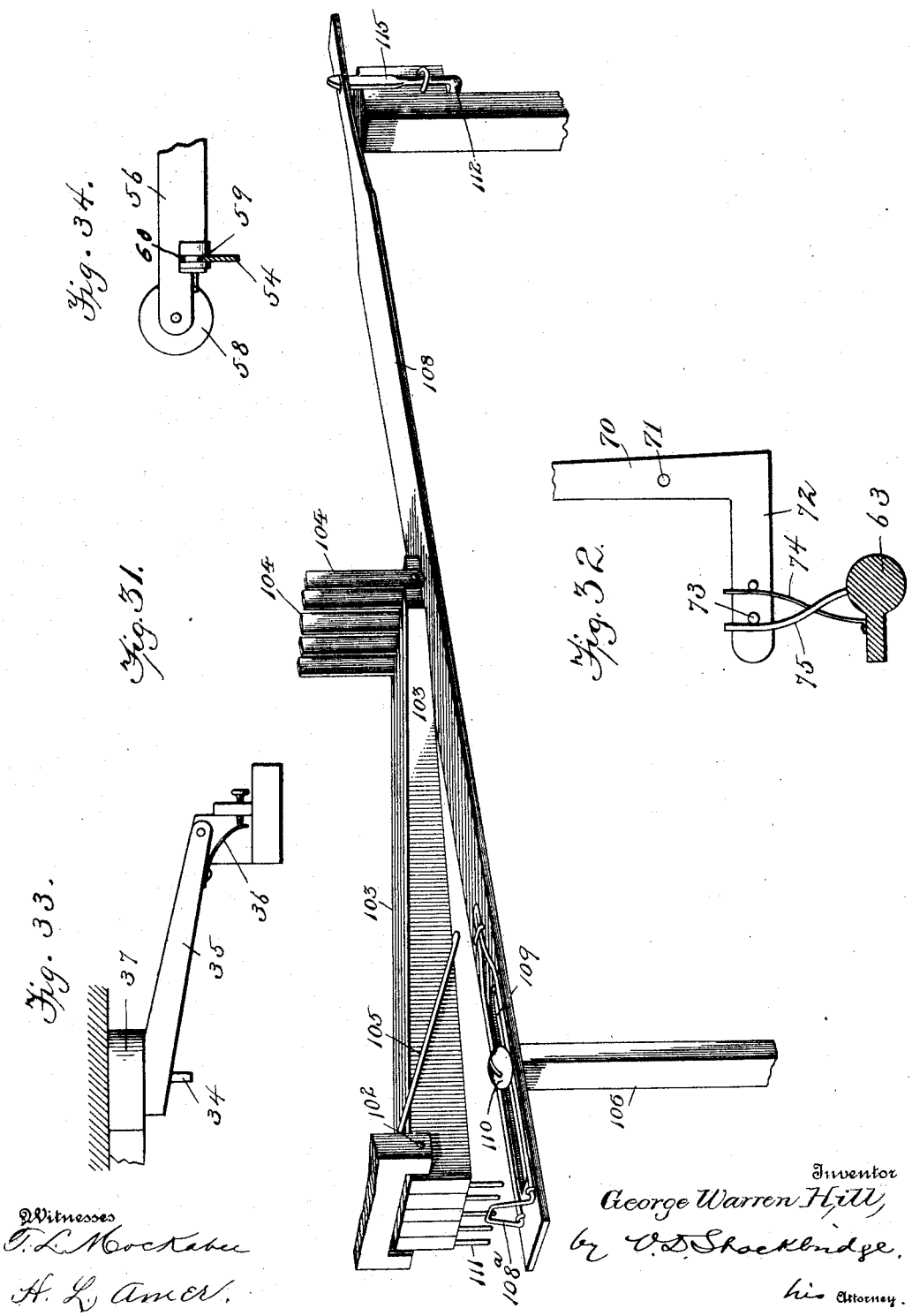

UNITED STATES PATENT OFFICE.

GEORGE WARREN HILL, OF CAVE IN ROCK, ILLINOIS.

CASH-REGISTER.

SPECIFICATION forming part of Letters Patent No. 618,941, dated February 7, 1899.

Application filed May 27, 1897. Serial No. 638,469. (No model.)

*To all whom it may concern:*

Be it known that I, GEORGE WARREN HILL, of Cave in Rock, in the county of Hardin and State of Illinois, have invented certain new and useful Improvements in Cash-Registers; and I do hereby declare the following to be a full, clear, and exact description of the invention, such as will enable others skilled in the art to which it appertains to make and use the same.

This invention relates to cash-registers of that character embodying, in addition to devices for correctly indicating the amount of any sale, mechanism to register the total amount of sales for any period of time and also embodying a recording or printing attachment intimately connected to and coöperating with the remaining mechanism at the proper time, the whole being actuated by exposed keys connected to key-levers.

The invention consists, primarily, of mechanism for indicating individual sales in succession, in connection with actuating devices for arranging and displaying the registered sum total of sales, together with shiftable printing mechanism, all of which operate in turn through the depression of key-levers positioned at the front of the machine in series and representing in part the digits and also corresponding to certain denominational columns on a strip of paper relatively arranged to said printing mechanism.

The invention further consists in the details of construction and arrangement of the several parts, which will be more fully hereinafter described and claimed.

The object of the invention is to produce a cash-register wherein parts of the mechanism are capable of independent use and so arranged that a laborious manual computation of the total sales will be unnecessary and an improper tampering with the machine defeated in view of the tally mechanically kept by the several devices and transmitted from one to the other and a permanent record established which cannot be obliterated nor changed without detection.

In the accompanying drawings, Figure 1 is a front elevation of the improved device with the casing removed. Fig. 2 is a side elevation of the same. Fig. 3 is a rear end elevation thereof. Fig. 4 is an elevation of the side opposite to that illustrated by Fig. 2. Fig. 5 is a detail sectional elevation of the bell-actuating mechanism. Figs. 6, 7, and 8 are detail views, respectively, in side elevation, plan, and perspective of the type-bar mechanism. Fig. 9 is a detail perspective view of the rock-shaft and part of its attachments connected to said type-bar mechanism. Figs. 10, 11, and 12 are detail views in plan and elevation of the wedge-plate and the mechanism connected therewith for arranging either the units, tens, hundreds, or thousands columns of the recording mechanism in position. Figs. 13, 14, and 15 are detail views of the registering mechanism. Figs. 16, 17, 18, and 19 are detail views of the adding mechanism. Fig. 20 is a detail broken perspective view of a part of one of the key-levers and wire acting in connection therewith and the operating mechanism above said lever. Fig. 21 is a detail perspective view of a lever and its attachments carried by the shifting frame and operating, in conjunction with the mechanism employed, to arrange the units, tens, hundreds, and thousands columns of the recording devices in proper position. Fig. 22 is a detail side elevation of the ratchet mechanism for feeding the paper strip and showing the paper-roll support, platen, and the bar running from one of the key-levers. Fig. 23 is a detail broken perspective view of a part of the key-levers and mechanism coacting therewith. Fig. 24 is a sectional elevation showing one of the adjusting-screws to limit the downward movement of a portion of the shifting frame. Fig. 25 is a detail view of a part of the shifting frame and the spring for restoring the same to its normal position. Fig. 26 is a detail perspective view of a part of the adding mechanism. Fig. 27 is another detail view representing other parts of the adding mechanism. Fig. 28 is a detail view of a part of one of the key-levers and the post carried thereby. Fig. 29 is a top plan view of the front part of the key-levers. Fig. 30 is a detail sectional elevation of a portion of one of the key-levers, the cash-drawer, and means for releasing said cash-drawer to allow the same to automatically open. Fig. 31 is a detail view of intermediate connecting mechanism between the rock-shaft on the shifting frame and the indicator-bars. Fig. 32 is a detail view of an indicating device for showing the position of the shifting frame in the step-by-step movement of the latter. Fig. 33 is a detail plan view showing the spring-pressed arm for holding the paper roll or strip in place. Fig. 34 is a detail side elevation of the end of the lifting-arm, showing the relation of the grooved roller to the latch-bar.

Referring to the drawings, wherein similar numerals of reference are employed to indicate corresponding parts in the several views, the numeral 1 designates the frame of the improved device, which is inclosed by a suitable casing 2, having in the lower part thereof a cash-drawer 3, carrying within it a spring-roller, a flexible band $4^a$ being attached at one end to the casing and at its opposite end to said roller and serving, in connection with the spring-roller 4, to automatically open said drawer. A catch 5, as clearly shown in Fig. 30, acts to hold the drawer in its closed position and is released by mechanism more fully hereinafter described. The frame 1 has a transverse rod 6 located in the rear, to which are pivoted the rear ends of a series of ten key-levers 7, and a second series of levers 8 are also attached to said rod and an additional lever 9. (See Fig. 3.) The levers 7 are each provided with an upright post 10, having a key-head 11 on the upper end thereof, and said posts and key-heads are preferably arranged in alternation or staggered, as shown, and each bears one of the digits and a cipher thereon, commencing on the left with "0" and terminating at the numeral "9" on the right. (Shown fully in Fig. 29.) A series of springs 12, contacting with the frame, are secured to the under side of all of the said levers and serve to keep the latter normally raised above the base of the frame, (best shown in Fig. 2,) said springs bearing on a smooth plate, as at $12^a$. Extending transversely across the base and over the top of the said levers is a stop-bar 13 to limit the upward motion thereof, the downward movement of all the levers being regulated by adjusting-screws 14, located beneath the front ends thereof and supported by the said base. Between the several levers set forth guides 15 are positioned to prevent them from bearing against each other, and thereby avoid frictional interference of one key-lever with another. A lever 16 is pivoted at one end to the upper part of the frame, as at 17, and extends over the entire bank of levers before mentioned at a proper elevation, and secured to said lever 16 and the key-levers set forth are wires 18, there being ten of these wires in all, one to each of said key-levers 7. The wires are formed with upper angularly-bent ends 19 and are loosely fitted in guides $19^a$ on the lever 16 with one exception, hereinafter noted, and in such manner that the said lever 16 may be moved down by one of said wires without operating the remaining wires of the series. The lower ends of the wires are also arranged at an angle and are formed with two loops $19^b$ and $19^c$, which normally rest upon and are loosely connected to the key-levers 7 by means of adjusting-screws 20, rising from each of said levers and extending through the loops $19^b$, the said latter loops and the screws being arranged in engagement with each other by screw-nuts on the said screws. The loops $19^c$ have guide-pins 21 passing therethrough, said screws being situated in the rear of the screws 20. This form of attachment is best illustrated in Fig. 20, and in operation a depression of any one of the key-levers until the end thereof bears on its adjusting-screw will cause the loosely-connected end of each wire to be automatically arranged relatively to the angular or abnormal position of its lever. Of course the depression of each key-lever will be regulated through the medium of the adjusting-screws 14 to vary the degree of pressure required to actuate the connected mechanism at the proper time. A depending bar 22 has its upper end pivoted to the lever 16, as at 23, and on the upper part thereof is secured a bracket or guide $23^a$ for the wire 18, running to the lever representing the numeral "9." The several wires extend in a line transversely of the machine, and when one is operated by its key-lever to pull down the lever 16 the others remain undisturbed, as previously stated, because the guides $19^a$ slip downwardly thereover. The wire in connection with the lever farthest to the left pulls the lever 16 downwardly a less distance than the next succeeding wire, and so on through the whole series of wires, in order that the printing mechanism may be properly operated to bring the type carried thereby in position under the platen thereof, as will be hereinafter particularly set forth.

The printing mechanism is located on a shifting frame 24, which is movably suspended from the main frame by two front rods 25, a stiff strip $25^a$ at the back, and by two bottom strips $25^b$, pivoted at their rear ends to the rear part of the frame 1 and at the front also pivoted to the said shifting frame. (See Fig. 2.) The said strips $25^b$ prevent forward and backward movement of the swinging frame and also steady the lateral movements thereof. Attached to the lower front part of the shifting frame is a rock-shaft 26, Figs. 7 and 8, provided with a projecting bearing-loop 27, on which the lower end of the bar 22 is rested, said shaft having connected thereto a spring 28 on the lower front portion of the said shifting frame by means of a chain 29, which operates to return the said shaft and the several parts coacting therewith to their normal position. A rocker-arm 30 is carried upon the said rock-shaft, and thereto is connected the printing mechanism, which will be subsequently specifically set forth. The key-lever 9 has attached thereto a pendent rod 31, which bears on the arm $5^a$, projecting from a roller $5^b$, and from the opposite portion of the latter extends a catch 5, which engages a loop $5^c$ on the rear of the cash-drawer 3. Hence a depression of the lever 9 throws down the arm 5ᵃ and elevates the catch 5, releasing the drawer 3, and permits the same to be automatically opened by the spring-roller 4. A bar 32 is also secured to the lever 9 and extends upwardly through a guide 33, attached to the upper part of the supporting-frame. A spindle 34 is secured to one side of the upper portion of the frame, Fig. 22, and a bar 35, pivoted to the frame at its rear end and having a pressure-spring 36 bearing thereagainst, has its free end projecting over the said spindle to hold in place a rolled paper strip 37, adapted to be mounted on said spindle. The paper strip from the said roll is led through guides 38 and 39 around a platen 40 to a spool 41, both in advance of the spindle 34, the said platen projecting outwardly and downwardly and located immediately above the printing devices and said spool being supported in bearings 42 and having on one side thereof a ratchet 43. A pin 44 on the beforementioned bar 32 engages and coacts with the said ratchet 43 to turn the spool 41 when the lever 9 is operated, and an adjacently-supported pawl 45 prevents the spool from turning backwardly.

From the foregoing it will be seen that by the depression of the key-lever 9 the bar 32 will actuate the ratchet 43 and cause the paper to be fed forwardly and at the same time cause the drawer to open by releasing the catch 5. It is intended that a bell 46 be connected with the front part of the casing and operated by a hook 47, carried adjacently by the lever 9. The key-lever 9, which releases the drawer, is the only lever of the series of key-levers actuating the paper-feeding mechanism, and the paper is fed forward at every depression of said lever at the time the cash-drawer is opened, thereby bringing a blank part of the paper strip in relative position to the printing mechanism. The mechanism set forth comprises the paper-feeding devices, and the means by which the different numerals are printed upon the paper strip will now be considered.

The means by which the different numerals corresponding to the key-levers 7 are printed on the paper strip comprises a connecting-bar 48, attached to the arm 30 of the rock-shaft, and on the shifting frame 24 guide-rods 49 are supported at the inside thereof, on which a carriage 50 has free movement, the latter having connected thereto the said bar 48. (See Figs. 6 and 7.) Attached to and movable with the carriage 50 is a type-bar 51, bearing upon the upper edge of the outer end thereof a series of type embracing the cipher and numerals from "1" to "9," and above the same is an inking-roller 52, rotatably mounted in an overhanging portion of the main frame and provided with a shield 53. The type-bar 51 moves directly beneath the platen 40, over which the paper strip shifts and has its front portion from about midway of its length inclined outwardly relatively to the main portion thereof to clear the adjacent mechanism in its primary movement and properly engage the strip of paper surrounding the platen during the secondary or impression elevation of the type-bar. The outward rotation of the rock-shaft through the arm 30 and bar 48 shifts the carriage 50 forwardly and moves the type-bar therewith outwardly beneath the platen, and this movement is regulated to vary in accordance with the key-lever depressed to bring the proper type under the platen by means which will now be described.

Pivoted to the main frame is a latch-bar 54, extending beneath said type-bar, Fig. 1, and attached to the same at the lower end is a spring 55, which normally tends to draw the said bar upwardly. A lifting-arm 56 is movably secured to the rear part of the outer side of the shifting frame 24, being pivoted, as at 57, and in its free end a roller 58 is mounted and is located directly beneath the type-bar and serves to support and steady the same. In the front lower portion of the arm 56 is journaled a transversely-movable roller 59, having a groove 60 therein which is engaged by the bar 54 to institute an antifrictional contact as well as a guide, and on the opposite sides of the front of the lifting-arm 56 are guides 56ᵃ and 56ᵇ to retain the type-bar in proper position under the platen and to prevent it from having too great lateral movement, and thereby insure a regularity in the impression of the type at different points on the paper strip passing over the adjacent part of the platen.

Attached to the main frame are oppositely-positioned supports 62, Figs. 1 and 2, in which the ends of a rock-shaft 63 have bearing in advance of the wires 18 and is connected to the key-levers in a manner similar to the lever 16 by means of wires 64, Fig. 23, having lower loosely-fitting ends similar to said wires 18 and held in connection with the said key-levers by guide-pins 65 and adjusting-screws 66. The rock-shaft 63 has at one end a rearwardly-projecting rocker-arm 67, which movably supports an arm 68, having a keeper 68ᵃ extending beyond the rear termination thereof and adapted to fit over the latch-bar 54 to hold the latter in its normal lowered position. The arm 68 also has a guide or stay pin 68ᵇ working in the casing to prevent upward movement of said arm. The wires 64 extend above the rock-shaft 63 to such extent as to allow the type-bar 51 to be drawn out before the said rock-shaft 63 is rotated or moved. The said wires 64 are materially shorter than the wires 18, and the latter operate the lever 16 some time before the former actuate the said rock-shaft 63 to insure a proper position of the type-bar 51 before an impression is made or before the keeper 68ᵃ is released from the latch-bar 54. When the key-lever is depressed and through the lever 16 and the intermediate mechanism the type-bar 51 is drawn outwardly, as hereinbefore described, and the proper type on the said type-bar is beneath the platen, the wire 64, attached to the key-lever depressed, actuates the rock-shaft 63, and the arm 68 is drawn back, thereby releasing the keeper 68ª from contact with the upper edge of the latch-bar 54, allowing the latter to be drawn upward quickly by means of the spring 55. An arm 69, projecting rearwardly from the rock-shaft 26, Figs. 6 and 9, is connected to the lifting-arm 56 by means of some flexible connection, as a cord or chain 69ª, in such manner that when the said rock-shaft resumes its normal position the type-bar will be automatically lowered and simultaneously press down the latch-bar 54 to such a level as to permit the keeper 68ª, which has been during this time pressing against the outer portion of the latch-bar, to slip over the top edge of the said latch-bar, and said keeper remains in this position until a succeeding similar operation ensues. The type-bar 51 is pivotally attached to the carriage 50 and is thrown against the platen with more or less force; but the mechanism of these parts is so adjusted that unless the spring 55 is brought suddenly into play by the releasing action of the latch-bar 54 the said type-bar will just clear the platen and make no impression upon the paper strip. A lever 70 is pivoted, as at 71, to the frame 1 and has a forwardly-projecting arm 72 attached to the lower part thereof and is provided with a projection 73, against one side of which bears a spring 74, attached to the rock-shaft 63, and holds said lever in its normal adjusted position. A pin 75, projecting from said rock-shaft 63, bears against the opposite side of the projection 73 when the said latch-bar is locked. A handle 76 is formed on the upper end of the lever 70 and projects through an opening in the casing, and a pin 77, extending out from the frame adjacent the said handle, serves to limit the outward movement of said lever. In the first position of the said lever 70, or when the latter is moved outwardly, the spring 74 is under tension and the latch is locked, while in the second position the projection 73, striking against the pin 75, serves to draw the arm 68 and the keeper 68ª, carried thereby, outwardly toward the front of the machine and releases the bar 54 by turning the said rock-shaft 63 also toward the front of the machine, thereby permitting the latch-bar to rise easily with the mechanism above the same. When the lever 70 is thrown back and the keeper 68ª is drawn outward from over the latch-bar, the pressure of one of the key-levers will allow the type-bar to rise immediately and then move forward, the type-bar being upheld by the latch-bar, which is supported by the spring 55, the tension of the spring not being sufficient to draw the type-bar against the platen. The type-bar may thus move clear of the platen and the paper strip thereon without making an impression on the strip. In the opposite position of the lever 70 the type-bar will be thrust outward, as hereinbefore described, and suddenly released by the withdrawal of the keeper, whereupon the spring 55 will act to throw the type-bar against the paper strip, the keeper not being withdrawn until the type-bar has nearly reached the outward limit of its movement. It will thus be seen that by means of the lever 70 the printing mechanism may be thrown into and out of operation as desired.

It is one of the essential features of this device that the key-levers operated to print the units can also be used to print the tens, hundreds, and thousands, and the means for accomplishing this will now be described. The levers numbered 8 are each provided with a hook 78, securely held thereon, (see Figs. 1 and 23,) and the series of said hooks are of different lengths to correspond to the key-levers to which they are attached, each one of said key-levers corresponding to a certain column of figures. A rock-lever 79 is secured to one side of the main frame, as at 80, and has its inner portion extending upwardly and its rear termination 81 bent inwardly in a horizontal plane. A spring or yielding cushioning-plate 82, with an angular bend at its free end, is held upon the shifting frame 24 in such position that the termination of said lever 79 will strike against this plate when either of the key-levers 8 is depressed and one of the hooks 78 caused to depress the lever 79. A toothed wedge-plate 83, having a lower reduced or tapered portion, moves in guides 84, secured to the shifting frame, and the teeth on the opposite edges of this plate are formed on one side like the usual ratchet-teeth and on the opposite side they are arranged as a series of steps, as indicated by the numeral 85. This construction is shown in detail in Figs. 10, 11, and 12. A lever 86 is also pivoted to the shifting frame, as at 87, and has a downward pressure exerted thereon by a spring 88, attached to the adjacent part of said shifting frame. A cam 89, projecting rearwardly from the rock-shaft 26, coacts in conjunction with a cam-surface 90, formed on the under side of the front end of the lever 86, and said latter lever 86 is provided with a spring-pawl 91, adapted to coact with the ratchet-teeth in the inner edge of the plate 83 and so arranged that it will move the plate 83 upwardly a distance of one tooth at each motion of the rock-shaft 26. A catch-plate 92 is held on the frame 1 in such position that the teeth on the adjacent plate 83 will bear against it, and a spring 93 is also attached to the frame 1 and to the shifting frame 24 to automatically move the said frame to the right or restore it to its normal position. The manner in which this shifting action takes place will now be described. It should be remembered in this connection that the type-bar 51 and the different parts coacting therewith are carried by the shifting frame 24. If it be desired to print any numeral in a certain column, the key-lever 8 which corresponds with that column is depressed, and through the medium of the rock-shaft 26 the shifting frame is moved to the left a predetermined distance. The plate 83 drops by gravity and the proper tooth bears against the plate 92, thus holding the shifting frame in the desired position. The desired key-lever 7 is then pressed, which actuates the rock-shaft 26, as hereinbefore described, and this in turn operates the cam 89 and raises the lever 86, moving the plate 83 upwardly one notch, and at the same time the spring-pawl 91 on the lever 86 engages the ratchet-teeth on the plate 83, and the spring 93 being free to exert its retractile effort draws the shifting frame to the right, so that the plate 83 again bears against the plate 92, and the device is in position to print a figure in the next column. This operation is repeated until the units-column is reached. This completes the operation of the printing mechanism and all the devices in the present instance necessarily incidental thereto, and the mechanism used in the improved device for indicating the amount of the purchase will be next set forth.

Upon the main frame is supported a guide 94, located at the upper rear portion thereof, having movably mounted therein a series of indicator-bars 95, (see particularly Figs. 1, 13, and 14,) there being one indicator-bar for each column of figures the device is intended to register—that is to say, if the device is intended to be used to six figures or to hundred thousands there will be six indicator-bars. The said indicator-bars have ratchet-teeth 96 on the front lower portions thereof, as shown. A rod 97 stands out from the lower part of said guide and is supported in bearings 98, and upon said rod are held a series of pawls 99, one for each of said indicator-bars, and bearing against said pawls are springs 100 to keep them pressed against said indicator-bars and in engagement with the teeth 96 thereon. A series of numerals 101 are applied to each of said indicator-bars and face toward the front of the device; but there may, however, be a similar series of said numerals on the back of said indicator-bars, if desired. A supporting-bar 102 is attached to the rear upper part of the frame 1 (see Fig. 31) and has the rear ends of the series of levers 103 pivotally mounted thereon and provided with connecting-rods 104, movably attached to the front ends of said levers and also to the lower ends of the indicator-bars 95. A guard 105 serves to limit the downward motion of the levers 103, being located under the rear portions of the latter and also act similarly through the connections set forth on the indicator-bars 95. A lever 106 is also pivotally attached to the frame 1 and connected to the shifting frame 24 by a rod or analogous device 107, and on the upper end of this latter lever is carried a horizontal reciprocating bar 108, having a slot 109 therein in the rear end thereof, through which extends a vertically-positioned bolt 110, rising from the upper end of and operatively connecting said bar 108 to the said lever 106. A pendent pin 111 projects from the rear of each of the levers 103 and is in such position that when the said bar 108 is reciprocated an upwardly-projecting loop or striker 108$^a$ on the said bar will contact with the pin 111 in alinement therewith and raise the front end of the lever 103, carrying said pin and in turn elevating the complementary connecting-rod 104 and indicator-bar 95. A bell-crank lever 112 is mounted upon the shifting frame, and the left arm 115 thereof is extended upwardly at an angle and connected to the front end of the horizontal reciprocating bar 108. The opposite end of the said bell-crank lever 112 is also provided with an arm 113, connected by a link 114 to the rock-shaft 26, and through the latter connection the said bell-crank lever is operated. The devices illustrated in Figs. 13, 14, and 15 also show this construction, and it is obvious that the operation of any one of the key-levers will cause the reciprocating bar to raise the desired indicator-bar in position to be operated by said reciprocating bar through the mechanism heretofore described and that its pawl will retain the same in position. The movement of the shifting frame 24 correspondingly moves the reciprocating bar, and the latter is caused to act upon any desired indicator. The indicator-bars are released by a lever 116, pivotally attached at one end to the frame 1, as at 117, Figs. 1 and 23. This lever 116 is connected to the rock-lever 79, which operates the shifting mechanism by means of an eye 118. A lever 119, provided with a U-shaped portion 120, normally located in the rear of the pawls 99, is carried in bearings 121 upon the upper front portion of the guide 94. The right side of the lever 119 has an angularly-disposed arm 122 projecting toward the front of the machine and connected to the lever 116 by a small rod 123, and when either of the key-levers 8 is depressed the lever 116 is drawn downwardly by devices heretofore set forth, thus forcing the U-shaped portion 120 of the lever 119 against the pawls 99 to release the indicator-bars 95 to permit the latter to fall by their own weight. This completes the indicating mechanism, and the adding mechanism will now be set forth.

Upon the spindle 124, mounted in the frame 1 to one side of the indicating devices, are a series of ratchet-wheels 125, being one in excess of the number of the indicating-bars 95 and revolubly movable between guide-plates 126, also attached to an adjacent part of the frame 1. (See particularly Figs. 2, 16, 18, 19, and 26.) The ratchet-wheels 125 are each provided with a series of teeth, the number of which is exactly divisible by ten, and opposite each tenth tooth a pin 127 is inserted in the face of each ratchet-wheel. A series of levers 128 are pivotally connected to the frame 1, as at 129, and springs 130 normally hold these levers against a stop 131. A series of pawls 132, one for each of said levers, are carried upon a pivot attached to the latter. Each of said levers has a projecting tooth 133, which lies in the path of the pin 127, attached to the wheel adjacent to that wheel upon which the pawl operates. The length of this projection is such as will permit the lever with its attaching-pawl to be moved by the pin 127 a distance of one tooth only. Thus when one wheel has been turned through ten teeth the adjacent wheel will be moved one tooth, and so on through the whole series. A series of pawls 135 are attached to the frame 1 to prevent the backward motion of the ratchet-wheels 125. Levers 136 are pivoted at their front ends to the front part of the frame 1, as at 137, and in the guide 138 operates a series of registering-bars 139, having a line of numerals 140 on each. The lower ends of these registering-bars 139 are pivotally attached to the levers 136, the latter having cam-surfaces 141 formed on the lower edges of the rear ends thereof and adapted to coact with the pins 127 on the ratchet-wheels 125. The connecting rod or bar 48 carries at its rear portion a pawl 142, held to act against one of the ratchet-wheels by means of a spring 143, and a stop-lever 144, pivoted intermediate its ends to the said rod or bar 48, as at 145, serves when rocked in the proper direction to throw the rear end of said pawl in such position as to render it inactive when desired. It will now be plain that when one of the key-levers is depressed the pawl 142 will turn the adjacent ratchet-wheel through the desired number of teeth or spaces, causing the pin 127 to raise the end of its respective lever 136 and the registering-bar connected thereto, and thus indicate the sum of the last-displayed numeral together with the previously-registered amount. When the pin 127 passes the end of the cam 141, the lever 136, together with the register-bar, falls back until the cam contacts with the next pin 127. Meanwhile the carrying device has through the pawl 132 effected the movement of the registering-wheel of the next higher order. A casing 146, provided with an opening 147, is placed upon each of the guides 94 and 138, having suitable sight-openings therein for exposing the figures on the indicator-bars. In order to provide for the adjustment of the spring 55, a lever 148 is mounted upon the frame 1 and has the upper end of said spring attached thereto, and by means of the cam 149, movably mounted beneath said lever 148, the latter can be raised or lowered to increase or decrease the tension of the spring. Near the said lever 148 a hook 150 is attached to the frame and is adjustable over the latch-bar 54. This hook 150 is to cause the type-bar 51 to recede after having been drawn quickly against the platen. The spring 55 by a sudden impulse forces the type-bar 51 upwardly against the hook 150 with sufficient force to raise the said hook above its normal position and allow the type to strike the paper strip on the platen, but immediately the said hook forces the type-bar downwardly a sufficient distance to allow it to be withdrawn without blurring the paper.

When the machine is used for adding more than one or two columns, it will be found convenient to apply a device whereby one key-lever may be used to move the shifting frame 24 into two positions of a greater or less extent. (See Figs. 1 and 28.) This is accomplished in the following manner: The key-posts 10 of the key-levers 8 are pivotally mounted in slots $150^a$ in said key-levers, springs 151 holding the said posts in normal position. The limiting-stops beneath these key-levers are duplicated, as at $151^a$ and $151^b$, the stop $151^a$ being engaged by the lower end of the key-post in each instance when the key-lever carrying the same is normally operated, and when the said key-lever is depressed under these conditions the shifting frame will be moved a distance not exceeding that required for two columns. By tilting the key-post and moving the lower end of the same out of line with the stop $151^a$ to throw it into line with the stop $151^b$ the key-lever can be depressed a greater distance and thereby shift the frame 24 farther to the left to increase the columns, the slot $150^a$ in the key-lever being inclined to accommodate this operation. It will also be understood that the said stops $151^a$ and $151^b$ may be primarily adjusted, and the depression of the key-levers 8 can thereby be regulated, all of which is clearly shown in Fig. 28. A vertical scale-plate 152 is mounted on the upper part of the front portion of the casing coincident with a slot in the latter, and extending upwardly through the said slot is a pointer 153, pivoted to the main frame at its lower end and also attached to the shifting frame 24 by a guiding-bar $153^a$ and designates on the said scale-plate what column is about to be added. (See Figs. 1 and 3.) This pointer partakes of the step-by-step movement of the shifting frame and jumps from one column to another, as indicated by the scale, as the key-levers are depressed.

Having thus described the different parts of the device, the operation thereof will now be noted, and in order to render this clear an assumption will be made under certain conditions. Let it be supposed that both sets of indicator-bars 95 and 139 are at zero throughout, and assume that a sale has been made amounting to one dollar and ninety-three cents. The key-lever 8, which designates the hundreds column, is depressed and the shifting frame 24 and the mechanism thereon move so that the type-bar 51 will print in the third column. Furthermore, the pawl that acts upon the ratchet-wheel is carried to the rod also. The apparatus being now set ready for use, the key-lever designating the numeral or digit "1" is depressed, the type-bar moves outwardly and stamps the numeral "1" upon the paper strip, and the pawl operates the third ratchet-wheel, moving it one tooth, which in its turn raises the third lever and the register-bar attached thereto to display the numeral "1" through the casing. The reciprocating bar 108 meanwhile raises the proper indicator 95, displaying the same numeral thereon, and the plate 83 is raised one notch, allowing the shifting frame 24 to move one column to the right. This operation is repeated in indicating, registering, and recording the numerals "9" and "3." If the succeeding sale amounts to seventy-five cents, the key-lever 8, designating the tens column, is depressed, and the pawls on the individual-sales indicator are disengaged, thus releasing the indicator-bars therein that may at the time be elevated to permit them to drop as the shifting frame 24 slides over to the second column. The operation above described is repeated; but as the bar 129 has not been reset when the key-lever bearing the numeral "7" has been depressed the second ratchet-wheel is turned seven notches, which will turn the third ratchet-wheel one additional notch, inasmuch as the total number of notches turned on the second wheel will be sixteen, and this operation will be carried on indefinitely. The mechanism may be arranged to enable the operator to print as often as desired the sum total at the bottom of the column recorded on the paper strip without having each added to itself, and for this purpose the stop 144, which is pivoted at the center, is thrown down at its front end and raises the front end of the pawl 142, and consequently depresses the rear engaging end of the latter, thereby rendering said pawl inactive, and when the key-levers representing the numerals or digits are depressed no addition will take place. The proprietor only has access to this stop and the mechanism coacting therewith, and the daily, weekly, or monthly sales may be written in and permit the machine to carry its total for months, if desired. The machine is also useful for adding long columns or weights of other kinds than cash sales, and it may be used simply as an indicator alone by disconnecting the registering and recording devices, or both the registering and recording features may be detached from the remaining mechanism and no record at all be kept. It is intended to provide a suitable ornamental casing for the device; but it is not deemed necessary to show the same, as none of the essential features of the invention will be thereby disclosed.

It is obvious that many minor changes in the proportions, dimensions, and details of construction might be made and substituted for those shown and described without in the least departing from the essential features of the invention or sacrificing any of the advantages thereof.

Having thus described the invention, what is claimed as new is—

1. In a cash-register, the combination with a series of digit key-levers, of printing mechanism actuated by said key-levers, and including a longitudinally-slidable type-bar, a laterally-shiftable frame carrying said type-bar and other parts of said printing mechanism, an indicating mechanism actuated by said key-levers, registering mechanism also actuated by said key-levers, and a second set of key-levers for controlling the position of the said shiftable frame.

2. In a cash-register, the combination with a series of levers each bearing a key, of a longitudinally-slidable type-bar actuated by said levers, a laterally-shiftable frame supporting said type-bar, a second series of levers for controlling the movement of said frame, a platen above the type-bar to receive a paper strip, and means for moving the paper on said platen.

3. In a cash-register, the combination with a longitudinally-movable laterally-shiftable type-bar, a platen above said bar and adapted to receive a strip of paper, a spool over which said paper passes, an operating-lever for actuating said spool and a single key-lever connected through the operating-lever to said spool and the cash-drawer, a depression of said key-lever simultaneously releasing the cash-drawer and moving the strip of paper.

4. In a cash-register, the combination of longitudinally-movable laterally-shiftable printing mechanism, a platen above said printing mechanism having a guide to receive a strip of paper, a cash-drawer, a single key-lever operating by its depression to move the strip of paper over the platen and simultaneously release the said cash-drawer, and other independent key-levers for shifting said printing mechanism.

5. In a cash-register, the combination with a frame, of a platen mounted thereon, a spindle on said frame adapted to receive a rolled strip of paper, means for holding the paper on said spindle, guides to receive the strip of paper to conduct the same around the platen, a spool rotatably mounted on said frame and also receiving said strip of paper, means for rotating said spool, a printing attachment comprising a type-bar having a longitudinal and a transverse adjustment, a single key-lever for shifting the paper strip, an independent set of digit key-levers, and a third set of key-levers for controlling the movement of said printing attachment.

6. In a cash-register, the combination with a supporting-frame, of a platen engaged by a paper strip, a spool rotatably mounted on said frame and also receiving said paper strip, a ratchet attached to said spool, an operating-lever for said ratchet, a single key-lever to which the said operating-lever is connected and having a depending rod, a cash-drawer having a catch operated by said rod, and a pawl held upon said frame and adapted to coact with said ratchet to prevent said spool from turning backwardly, said key-lever by its depression acting simultaneously upon the cash-drawer and to move the strip of paper over the platen.

7. In a cash-register, the combination with a supporting-frame, of a platen held thereon engaged by a paper strip, a spool rotatably held on said frame and also adapted to receive said paper strip, a ratchet connected to said spool, a normally-elevated key-lever, an operating-lever connected to said key-lever and engaging said ratchet-wheel, a pawl held upon said frame and engaging said ratchet to prevent the spool from turning backwardly, a spindle mounted on said frame and adapted to receive the roll of the said paper strip, a spring-pressed lever pivoted to said frame and having its outer free end loosely bearing against the face of said roll to hold the latter in place, a series of key-levers, and a printing attachment.

8. In a cash-register, the combination with a drawer, of a spring-roller carried thereby, a flexible band attached to said roller and also to the frame or casing, a catch to engage and hold said drawer closed, an arm connected to the catch, and a normally-elevated key-lever having a depending rod to engage said arm for operating the catch and releasing the drawer.

9. In a cash-register, the combination with a frame, of a drawer, a spring held therein to automatically open said drawer when the latter is released, a catch adapted to lock said drawer in its closed position, a key-lever pivotally attached to said frame, a spring normally holding said lever in an elevated position, means for connecting said lever with said catch for releasing the latter when the said lever is depressed and permit the drawer to automatically open, a platen held on said frame to be engaged by a paper strip from a roll thereof, a spool rotatably mounted on said frame and adapted to receive said paper strip, a ratchet attached to said spool, a lever having a tooth thereon connected to said lever and adapted to operate said ratchet, and a pawl engaging said ratchet to prevent the spool from turning backwardly.

10. In a cash-register, the combination with a supporting-frame, of a drawer, a spring attached to said drawer to automatically open the same, a movable catch for locking said drawer in its closed position, a normally-elevated key-lever, means for connecting said key-lever with said catch and adapted to release the drawer, a platen held on said frame and engaged by a paper strip from a roll thereof, a spool rotatably mounted on said frame and also receiving said paper strip, a ratchet connected to said spool, a lever having a tooth thereon connected to said key-lever and operating the said ratchet, a pawl engaging said ratchet to prevent the spool from turning backwardly, and means for holding the rolled paper strip on the said frame.

11. In a cash-register, the combination of a supporting-frame, a drawer movably mounted therein, a spring connected to said drawer and operating to automatically open the same, a movable catch to lock said drawer in its closed position, a normally-elevated key-lever pivotally attached to said frame, means for connecting said lever with said catch, a platen held upon said frame and engaged by a paper strip from a roller thereon, a spool rotatably mounted on said frame and also adapted to receive said paper strip, a ratchet connected to said spool, a lever having a tooth therein attached to said key-lever and adapted to operate said ratchet, a pawl engaging said ratchet to prevent the spool from turning backwardly, a spindle attached to said frame to receive the rolled paper strip, a lever pivotally connected to said frame at its rear end and having its front free end loosely engaging the rolled paper strip, and a spring pressing against the latter lever.

12. In a cash-register, the combination of a supporting-frame, normally-elevated key-levers pivotally attached thereto, a stop to limit the upward motion of said levers, a guide mounted on said frame, a plurality of indicator-bars held within said guide and having front ratchet-teeth directly thereon, adjacently-situated pawls to engage the ratchet-teeth on the indicator-bars, a rock-shaft 26, lever 112 and connections therefrom to the indicator-bars and key-levers.

13. In a cash-register, the combination of a supporting-frame, a guide carried thereby provided with an aperture in one side thereof, an indicator-bar having a series of figures thereon and moving within said guide and adapted to display one of said figures before said opening, a normally-elevated key-lever pivoted to said frame, a stop adapted to limit the upward motion of said key-lever, an adjustable stop to limit the downward motion of said lever, and means for connecting said lever with said indicator-bar to operate the latter to display the numeral corresponding to the said lever.

14. In a cash-register, the combination of a supporting-frame, a guide mounted thereon having an aperture therein, an indicator-bar having a series of figures on the same and movable in said guide to display the figures thereon before the opening, a normally-elevated spring-actuated key-lever pivoted to said frame, a stop adapted to limit the upward motion of said key-lever, an adjustable stop to regulate the downward motion of said lever, an upper lever pivoted to said frame, a connection between the upper lever and the key-lever, a shifting frame, a rock-shaft carried by said shifting frame, a depending bar connecting said rock-shaft and the upper lever, a spring connected to the rock-shaft for restoring it to its normal position, and connecting devices between said rock-shaft and said indicator-bar to cause the latter to display a different numeral at the opening in said guide.

15. In a cash-register, the combination of a frame, a guide carried thereby provided with an aperture in one side thereof, an indicator-bar having a series of figures thereon movable within said guide and adapted to display one of said figures at said opening, a normally-elevated spring-actuated key-lever pivoted to said frame, a stop to limit the upward motion of said key-lever, an adjustable stop to regulate the downward motion of said key-lever, a bell-crank lever transversely adjustable on the said frame, an indicator-bar connected to said bell-crank lever, and means for operating the said bell-crank lever through the actuation of the key-lever.

16. In a cash-register, the combination of a supporting-frame, a normally-elevated key-lever, a transversely-adjustable bell-crank lever, an indicator-bar having numerals thereon and connected to one part of said bell-crank lever, and means for connecting the said key-lever to the said bell-crank lever.

17. In a cash-register, the combination of a supporting-frame, a normally-elevated spring-actuated key-lever pivotally mounted thereon, a stop to limit the upward motion of said key-lever, an adjustable stop to regulate the downward motion of said key-lever, an upper lever pivotally attached to said frame, means for connecting said upper lever with the key-lever, a shifting frame supported by said supporting-frame, a rock-shaft rotatably mounted on said shifting frame, means for connecting the upper lever of said rock-shaft for actuating the latter by the depression of the key-lever, a spring for restoring the said rock-shaft to its normal position, a bell-crank lever also carried by said shifting frame, a guide having an opening therein, an indicator-bar provided with a series of numerals thereon adapted to be displayed through the opening in the guide, a rod connecting one arm of said bell-crank lever with said rock-shaft, a horizontal reciprocating bar engaging the opposite arm of the bell-crank lever, an intermediate mechanism between the opposite end of the horizontal reciprocating bar, and an indicator-bar for operating the latter to display the different numerals through the opening in said guide.

18. In a cash-register, the combination of a supporting-frame, a guide having an opening therein, an indicator-bar movably mounted in said guide and having a series of numerals thereon adapted to be displayed through the opening in the guide, a shifting frame, a bell-crank lever mounted on one side of the shifting frame, a reciprocating bar attached to one arm of the bell-crank lever, means for connecting the opposite end of said reciprocating bar with the indicator-bar, a rock-shaft supported by said shifting frame and also connected to said bell-crank lever, an upper lever pivoted to said supporting-frame, means for connecting said upper lever to said rock-shaft for restoring it to its normal position, a series of key-levers connected to said upper lever, a stop to limit the upward motion of said key-levers, and a series of adjustable stops beneath said key-levers to regulate the downward motion thereof, said key-levers being so arranged that the depression of any one will cause said upper lever to move through a certain definite angle varying in accordance with the point of connection of each of said key-levers therewith.

19. In a cash-register, the combination with a supporting-frame, of a guide having an opening therein, an indicator-bar having a series of numerals thereon adapted to be displayed through the opening in the guide, a bell-crank lever supported by said frame, connections between the lower end of said indicator-bar and said bell-crank lever, a reciprocating bar upon said frame engaged and actuated by said bell-crank lever, a shifting frame in said supporting-frame, a rock-shaft supported by said shifting frame, means for connecting said rock-shaft and said bell-crank, an upper lever pivoted to said supporting-frame, a means for connecting said upper lever and said rock-shaft adapted to actuate the latter, a spring adapted to hold the rock-shaft on the shifting frame in a raised position, a series of key-levers each connected to said upper lever, a series of springs adapted to hold said key-levers in a raised position, a stop to limit the upward motion of said key-levers, and a series of adjustable stops beneath said key-levers adapted to regulate the downward motion thereof, said key-levers being so arranged that the depression of any one will cause said upper lever to move through a certain definite angle, said angle varying for each of said key-levers.

20. In a cash-register, the combination with a supporting-frame, of a shifting frame supported thereon, a guide provided with an opening, a series of indicator-bars mounted in said guide and provided with numerals adapted to be displayed through said opening, a series of pivotally-attached levers and connecting-rods supported by said frame, a connecting-rod being pivoted to each indicator-bar, a horizontal reciprocating bar attached to said shifting frame and adapted by the movement thereof to actuate any one set of said levers and connecting-rods, and means for operating said reciprocating bar.

21. In a cash-register, the combination with a supporting-frame, of a shifting frame supported thereon, a guide provided with an opening therein, a series of indicator-bars provided with numerals thereon adapted to be displayed through said opening, a series of sets of connecting devices with intermediate pivots and supported by said frame, one set of each being connected to one of said indicator-bars, a horizontal reciprocating bar having its front end attached to said shifting frame and its rear end attached to said supporting-frame and adapted by the movement thereof to actuate any one of said sets of connecting devices, means for actuating said bar, and means for moving said shifting frame and bringing said bar in conjunction with any one set of said connecting devices.

22. In a cash-register, the combination with a supporting-frame, of a shifting frame supported thereon, a guide provided with an opening therein, a series of indicator-bars provided with numerals thereon adapted to be displayed through said opening, a series of interposed pivoted devices supported by said frame each connected to one of said indicator-bars, a reciprocating bar coacting with said pivoted devices, a bell-crank carried by said shifting frame and connected to said reciprocating bar, a normally-elevated spring-pressed key-lever pivotally attached to said supporting-frame, stops to limit the motion of said key-lever, and means for connecting one end of said key-lever to said bell-crank.

23. In a cash-register, the combination with a frame, of a shifting frame supported thereon, a rock-shaft on said shifting frame, a guide provided with an opening therein, a series of indicator-bars provided with numerals thereon adapted to be displayed through said opening, a series of intermediate pivoted devices supported by said frame and each connected to one of said indicator-bars, a reciprocating bar, a bell-crank carried by said shifting frame, and having one arm connected to said reciprocating bar, normally-elevated key-levers pivotally attached to said stationary frame, adjustable stops to limit the downward motion of said key-levers, means for connecting said key-lever and said rock-shaft, means for connecting said bell-crank lever and said rock-shaft, and means for holding said shifting frame in its adjusted position.

24. In a cash-register, the combination with a frame, of a shifting frame attached thereto, a spring adapted to hold said shifting frame in a definite position with reference to said fixed frame, means for moving said shifting frame against the action of said spring, a wedge-plate to retain said shifting frame in position when so moved and automatically permit said shifting frame to return to its normal position by a step-by-step movement, and means for operating said wedge-plate.

25. In a cash-register, the combination with a supporting-frame, of a shifting frame held thereon, a spring attached to said shifting frame and said supporting-frame adapted to hold said shifting frame in a definite position with reference to said supporting-frame, means for moving said shifting frame against the action of said spring, bearing-surfaces formed upon said shifting frame and said supporting-frame, a wedge adapted to be automatically inserted between said bearing-surfaces when the same are separated by the movement of said shifting frame against the action of the spring, and means to withdraw said wedge.

26. In a cash-register, the combination with a supporting-frame, of a shifting frame attached thereto, a spring adapted to hold said shifting frame in a certain definite position with reference to said supporting-frame, a means to move said shifting frame against the action of said spring, a bearing-plate held upon one of said frames, guides held upon the aforesaid frame, and a wedge moving within said guides provided with a series of stepped teeth adapted to be automatically inserted between said guides and said bearing-plate when said shifting frame is moved against the action of the spring thus retaining the same in one of a series of definite positions.

27. In a cash-register, the combination with a supporting-frame, of a shifting frame attached thereto, a spring adapted to hold said shifting frame in a certain definite position with reference to said supporting-frame, a means to move said shifting frame against the action of said spring, a bearing-plate held upon one of said frames, guides held upon the aforesaid frame, a wedge moving within said guides provided with a series of stepped teeth adapted to be automatically inserted between said guides and said bearing-plate when said shifting frame is moved against the action of the spring thus retaining the same in one of a series of definite positions, and means for raising said wedge and causing the shifting frame to resume its normal position.

28. In a cash-register, the combination with a supporting-frame, of a shifting frame attached thereto, a spring adapted to hold said shifting frame in a certain definite position with reference to said supporting-frame, a means to move said shifting frame against the action of said spring, a bearing-plate held upon one of said frames, guides held upon the aforesaid frame, a wedge moving within said guides provided with a series of stepped teeth adapted to be automatically inserted between said guides and said bearing-plate when said shifting frame is moved against the action of the spring thus retaining the same in one of a series of definite positions, and means for lifting the wedge by a step-by-step movement thus causing the successive teeth thereon to be engaged by the bearing-plate and causing said shifting frame to pass through a successive series of positions.

29. In a cash-register, the combination with a supporting-frame, of a shifting frame attached thereto, a spring adapted to hold said shifting frame in a certain definite position with reference to said supporting-frame, a means to move said shifting frame against the action of said spring, a bearing-plate held upon one of said frames, guides held upon the aforesaid frame, a wedge moving within said guides provided with a series of stepped teeth on the one edge and a series of ratchet-teeth on the opposite edge and adapted to be automatically inserted between said guides and said bearing-plate when said shifting frame is moved against the action of the spring thus retaining the same in one of a series of definite positions, a lever pivotally attached to said frame, a spring-actuated pawl adapted to coact with said ratchet-teeth, stops adapted to limit the motion of said lever, a normally-elevated spring-actuated key-lever pivotally mounted upon said frame, stops to limit the motion of said key-lever, and means for connecting said key-lever and the lever bearing said pawl adapted to actuate said ratchet when said key-lever is depressed.

30. In a cash-register, the combination with a supporting-frame, of a shifting frame attached thereto, a spring adapted to hold said shifting frame in a certain definite position with reference to said supporting-frame, a means to move said shifting frame against the action of said spring, a bearing-plate held upon one of said frames, guides held upon the aforesaid frame, a wedge moving within said guides provided with a series of stepped teeth on one edge and a series of ratchet-teeth on the opposite edge and adapted to be automatically inserted between said guides and said bearing-plate when said shifting frame is moved against the action of the spring thus retaining the same in one of a series of definite positions, a lever pivotally attached to said frame, a spring-actuated pawl adapted to coact with said ratchet-teeth, stops adapted to limit the motion of said lever, normally-elevated spring-actuated key-levers pivotally mounted upon said frame, stops to limit the motion of said key-levers, a rock-shaft held upon said shifting frame, a cam formed upon said rock-shaft adapted to raise said lever and operate said pawl, and means for connecting said rock-shaft to said key-lever.

31. In a cash-register, the combination with a supporting-frame, of a shifting frame attached thereto, a spring adapted to hold said shifting frame in a certain definite position with reference to said supporting-frame, a means to move said shifting frame against the action of said spring, a bearing-plate held upon one of said frames, guides held upon the shifting frame, a wedge moving within said guides provided with a series of stepped teeth on one edge and a series of ratchet-teeth on the opposite edge and adapted to be automatically inserted between said guides and said bearing-plate when said shifting frame is moved against the action of the spring thus retaining the same in one of a series of definite positions, a lever pivotally attached to said shifting frame and carrying a spring-actuated pawl adapted to coact with said ratchet-teeth on the wedge, stops adapted to limit the motion of said lever on the shifting frame, normally-elevated spring-actuated key-levers pivotally mounted upon said frame, stops to limit the motion of said key-levers, a rock-shaft held upon said shifting frame a cam carried by said rock-shaft adapted to raise said lever on the shifting frame and operate said pawl, an upper lever pivotally attached to said supporting-frame, a depending bar connecting said upper lever with said rock-shaft, a spring connected to said rock-shaft and normally holding the latter and said upper lever in normal position, a means for connecting said upper lever with said key-levers, and a spring normally holding the lever carrying the spring-pawl against one of said stops.

32. In a cash-register, the combination with a supporting-frame, of a guide having an opening in one side thereof, a series of loosely-mounted gravitating indicator-bars provided with numerals upon the face thereof held to vertically move in said guide and adapted to display one of said numerals at said opening and also provided with ratchet-teeth formed on the front faces thereof, a means for individually moving said indicator-bars in said guide, a shaft attached to said guide provided with a U-shaped portion located in rear of said pawls, a lever attached to said frame, a connection between said lever and shaft, and a key-lever having a hook thereon to operate said lever.

33. In a cash-register, the combination with a supporting-frame, of a guide having an opening in the side thereof held thereon, a series of indicator-bars provided with numerals impressed upon the face thereof held to move in said guide and adapted to display one of said numerals at said opening and also having ratchet-teeth formed thereon, a series of sets of movable levers and connecting-rods pivoted to each other and to the said bars for moving said indicator-bars in said guide, pawls engaging said ratchet-teeth, a shaft held to rotate upon said guide passing beneath said pawls and provided with a U-shaped portion, a spring adapted to hold said U-shaped portion out of contact with said pawls, means to rotate said shaft against the action of said spring and release the pawls, and means for operating said sets of levers and connecting-rods.

34. In a cash-register, the combination with a supporting-frame, of a guide having an opening in the side thereof held thereon, a series of indicator-bars provided with numerals impressed upon the face thereof held to move in said guide and adapted to display one of said numerals at said opening and also having ratchet-teeth formed therein, a means for moving said indicator-bars in said guide, a shaft held to rotate upon said guide passing beneath said pawls, and having a cam portion formed thereon, a spring adapted to hold said cam portion from contact with said pawls, a lever attached to said shaft, a key-lever pivotally attached to said frame, a spring beneath said key-lever adapted to hold the same in a raised position, stops to limit the motion of said key-lever, a key held thereon, and means to connect said key-lever with the lever upon said cam-shaft.

35. In a cash-register, the combination with a supporting-frame, of a guide having an opening in the side thereof held thereon, a series of indicator-bars provided with numerals impressed upon the face thereof held to move in said guide and adapted to display one of said numerals at said opening, and also having teeth formed thereon, a means for moving said indicator-bars in said guide, a shaft held to rotate upon said guide and having a cam portion, pawls to engage said ratchet-teeth on the bars and adapted to be held out of contact by the cam portion of said shaft, a spring adapted to hold said cam portion from contact with said pawls, a lever attached to said shaft, a key-lever pivotally attached to said frame, a spring beneath said key-lever adapted to hold the same in a raised position, stops to limit the motion of said key-lever, a key held thereon, a lever attached to said frame, a rod adapted to connect the lever on said cam-shaft with the last-mentioned lever, an eye upon this latter lever, a lever pivoted to said frame having a part thereof passing through said eye, and a connection between this lever and said key-lever.

36. In a cash-register, the combination with a supporting-frame, of a guide provided with an opening therein, a series of indicator-bars each provided with numerals impressed thereon, a series of key-levers pivoted to said frame, springs normally holding said key-levers in a raised position, a stop for limiting the upward motion of said key-levers, adjustable stops to limit the downward motion of said key-levers, keys attached to said key-levers each bearing a numeral impressed thereon, means for connecting said keys to said indicator-bars adapted to move the same and cause a figure corresponding to the figure upon the key to be displayed at the opening in the guide, a means for holding said plate in its raised position, and means for releasing the same.

37. In a cash-register, the combination with a supporting-frame, of a guide provided with an opening therein, a series of indicator-bars each provided with numerals impressed thereon, a series of key-levers pivoted to said frame, springs normally holding said key-levers in a raised position, a stop for limiting the upward motion of said key-levers, an adjustable stop to limit the downward motion of each of said key-levers, keys attached to said key-levers each bearing a numeral impressed thereon, a lever pivotally attached to said frame, rods connecting said lever with each of said key-levers, a shifting frame on the supporting-frame, a rock-shaft carried upon said shifting frame, a bar connecting said lever with said rock-shaft, a spring normally holding said lever in its raised position, a series of connections for said indicator-bars, a horizontal reciprocating bar connected to said rock-shaft and adapted to operate one of said connections at a time and raise one of said indicator-bars, and means to hold said indicator-bars in their raised position.

38. In a cash-register, the combination with a supporting-frame, of a guide provided with an opening therein, a series of indicator-bars each provided with numerals impressed thereon, a series of key-levers pivoted to said frame, springs normally holding said key-levers in a raised position, a stop for limiting the upward motion of said key-levers, an adjustable stop to limit the downward motion of each of said key-levers, keys attached to each of said key-levers each bearing a numeral impressed thereon, a lever pivotally attached to said frame, rods connecting said lever with each of said key-levers, a shifting frame supported by said frame, a rock-shaft carried upon said shifting frame, a bar connecting said lever with said rock-shaft, a spring normally holding said lever in its raised position, a series of connections for said indicator-bars, a horizontal reciprocating bar connected to said rock-shaft and adapted to operate one of said connections at a time and raise one of said indicator-bars, said indicator-bars having ratchets formed thereon, spring-actuated pawls adapted to coact with said ratchets and hold said indicator-bars in raised position, and means for releasing said pawls.

39. In a cash-register, the combination with a supporting-frame, of a guide provided with an opening therein, a series of indicator-bars each provided with numerals impressed thereon, and having ratchet-teeth, a series of key-levers pivoted to said frame, springs normally holding said key-levers in a raised position, a stop for limiting the upward motion of said key-levers, an adjustable stop to limit the downward motion of each of said key-levers, keys attached to said key-levers each bearing a numeral impressed thereon, a lever pivotally attached to said frame, rods connecting said lever with each of said key-levers, a shifting frame supported by said frame, a rock-shaft carried upon said shifting frame, a bar connecting said lever with said rock-shaft, a spring normally holding said lever in its raised position, a series of connections for said indicator-bars, a reciprocating bar connected to said rock-shaft and adapted to operate the said connections individually and singly raise one of said indicator-bars, spring-actuated pawls adapted to coact with said ratchet-teeth on the indicator-bars and hold the latter in raised position, a shaft held to rotate upon the guide provided with a cam portion adapted to engage and release said pawls, an arm attached to said shaft, and means for connecting said arm with one of said keys, thus releasing the pawls upon the depression of the key and permitting the indicator-bars to resume their normal position.

40. In a cash-register, the combination with a supporting-frame, of a guide provided with an opening therein, a series of indicator-bars each provided with numerals impressed thereon and provided with ratchet-teeth, a series of levers pivoted to said frame, springs normally holding said key-levers in a raised position, a stop to limit the upward motion of said key-levers, an adjustable stop to limit the downward motion of each of said key-levers, keys attached to said key-levers each bearing a numeral impressed thereon, an upper lever pivotally attached to said frame, rods connecting said upper lever with each of said key-levers, a shifting frame in said supporting-frame, a rock-shaft carried upon the shifting frame, a bar connecting said upper lever with said rock-shaft, a spring normally holding said lever and rock-shaft in normal position, a series of connections for said indicator-bars, a reciprocating bar connected to said rock-shaft and adapted to individually operate said connections and singly raise said indicator-bars, spring-actuated pawls adapted to coact with said ratchet-teeth on the indicator-bars and hold the latter in raised position, a shaft held to rotate beneath said pawls and having a cam formed thereon, a spring normally holding said cam clear of said pawls, an arm attached to said shaft, and means for depressing said arm thus causing said shaft to rotate and lift said pawls from engagement with said ratchet-teeth.

41. In a cash-register, the combination with a supporting-frame, of a guide provided with an opening therein, a series of indicator-bars each provided with numerals impressed thereon and a series of ratchet-teeth, a series of key-levers pivoted to said frame, springs normally holding said key-levers in a raised position, a stop for limiting the upward motion of said key-levers, an adjustable stop to limit the downward motion of each of said key-levers, keys attached to said key-levers each bearing a numeral impressed thereon, an upper lever pivotally attached to said frame, rods connecting said upper lever with each of said key-levers, a shifting frame supported by said frame, a rock-shaft carried upon said shifting frame, a bar connecting said upper lever with said rock-shaft, a spring normally holding said lever in its raised position, a series of connections for said indicator-bars, a reciprocating bar connected to said rock-shaft and adapted to individually operate said connections and singly raise said indicator-bars, spring-actuated pawls adapted to coact with the ratchet-teeth on the indicator-bars and hold the latter in raised position, a shaft held to rotate beneath said pawls and having a cam formed thereon, a spring normally hold said cam clear of said pawls, an arm attached to said shaft, a lever attached to said frame, a rod connecting said lever with said arm, a guide held upon said lever, a second lever attached to said frame moving within said guide, a key-lever mounted upon said frame, a spring normally holding said key-lever in a raised position, stops adapted to limit the motion of said key-lever, a key attached to said key-lever, and a rod connecting said key-lever with the last-mentioned lever.

42. In a cash-register, the combination with a supporting-frame, of a shifting frame attached thereto, a spring normally holding said shifting frame in a certain definite position with reference to said supporting-frame, means for moving said shifting frame against the action of said spring, means for holding said shifting frame in position when so moved, a guide mounted upon said supporting-frame having an opening therein, a series of indicator-bars each having numerals impressed thereon and ratchet-teeth formed upon the same, a series of connections pivoted to said supporting-frame each being attached to one of said indicator-bars, a bell-crank lever pivotally attached to said supporting-frame and held to move with said shifting frame, a reciprocating bar connected to said bell-crank lever and movable from one to the other of said connections, a means for reciprocating said reciprocating bar thus individually operating said connections and singly raising said indicator-bars, means for holding said indicator-bars in position when raised, and means for releasing the same.

43. In a cash-register, the combination with a supporting-frame, of a shifting frame mounted in said supporting-frame having a spring attached thereto normally holding it in a certain definite position with reference to said supporting-frame, means for moving said shifting frame against the action of said spring, means for holding said shifting frame in position when so moved, a guide mounted upon said supporting-frame having an opening therein, a series of indicator-bars each having numerals impressed thereon, ratchet-teeth formed upon said indicator-bars, a series of connections pivoted to said supporting-frame each having one part attached to one of said indicator-bars, a lever pivotally attached to said supporting-frame and held to move with said shifting frame, a reciprocating bar connected to said lever adapted to move from one to the other of said bell-crank levers by the movement of said shifting frame, a means for operating said reciprocating bar individually actuating said connections and singly raising said indicator-bars, a series of spring-pressed pawls each engaging with one of said indicator-bars and adapted to hold the same in position when raised, and means for disengaging said pawls and releasing said indicator-bars.

44. In a cash-register, the combination with a supporting-frame, of a shifting frame attached thereto, a spring normally holding said shifting frame in a certain definite position with reference to said supporting-frame, means for moving said shifting frame against the action of said spring, means for holding said shifting frame in position when so moved, a guide mounted upon said supporting-frame having an opening therein, a series of indicator-bars each having numerals impressed thereon, ratchet-teeth formed upon said indicator-bars, a series of connections pivoted to said supporting-frame each having one part thereof attached to one of said indicator-bars, a lever pivotally attached to said supporting-frame and held to move with said shifting frame, a reciprocating bar carried upon said lever adapted to move from one to the other of said connections by the movement of said shifting frame, a means for actuating said reciprocating bar thus operating one of said connections and raising one of said indicator-bars, a series of spring-pressed pawls each engaging with one of said indicator-bars adapted to hold the same in position when raised, a shaft carried by said guide and having a cam formed thereon adapted to act upon and disengage said pawls, and means for rotating said shaft.

45. In a cash-register, the combination with a supporting-frame, of a shifting frame attached thereto, a spring normally holding said shifting frame in a certain definite position with reference to said supporting-frame, means for moving said shifting frame against the action of said spring, means for holding said shifting frame in position when so moved, a guide mounted upon said supporting-frame having an opening therein, a series of indicator-bars each having numerals impressed thereon and also provided with ratchet-teeth formed upon said indicator-bars, a series of connections pivoted to said supporting-frame each having one part thereof attached to one of said indicator-bars, a lever pivotally attached to said supporting-frame and held to move with said shifting frame, a reciprocating bar carried upon said lever adapted to move from one to the other of said connections by the movement of said shifting frame, a means for operating said reciprocating bar thus operating one of said connections and raising one of said indicator-bars, a series of spring-pressed pawls each engaging with one of said indicator-bars adapted to hold the same in position when raised, a shaft held upon said guide beneath said pawls and having a cam formed thereon adapted to bear against said pawls and disengage the same, and means for rotating said shaft and disengaging the pawls.

46. In a cash-register, the combination with a supporting-frame, of a shifting frame attached thereto, a spring normally holding said shifting frame in a certain definite position with reference to said supporting-frame, means for moving said shifting frame against the action of said spring, means for holding said shifting frame in position when so moved, a guide mounted on said supporting-frame having an opening therein, a series of indicator-bars each having numerals impressed thereon, and ratchet-teeth, a series of connections pivoted to said supporting-frame each having one part thereof attached to one of said indicator-bars, a lever pivotally attached to said supporting-frame and held to move with said shifting frame, a reciprocating bar carried upon said lever adapted to move from one to the other of said connections by the movement of said shifting frame, a means for actuating said reciprocating bar thus operating one of said connections and raising one of said indicator-bars, a series of spring-pressed pawls each engaging one of said indicator-bars and adapted to hold the same in position when raised, a shaft held upon said guide beneath said pawls having a cam formed thereon adapted to bear against said pawls and disengage the same, an arm attached to said shaft, a key-lever pivotally attached to said supporting-frame, a spring normally holding said key-lever in a raised position, stops to limit the motion of said key-lever, a key with which to depress the said lever, and means to connect said arm and said key-lever thus rotating the shaft, releasing the pawls, and permitting the indicator-bars to resume their normal position.

47. In a cash-register, the combination with a supporting-frame, of a shifting frame held thereon, a spring normally holding said shifting frame in a certain definite position with reference to said supporting-frame, a key-lever, a spring normally holding said key-lever in a raised position, stops to limit the motion of said key-lever, a key held upon said key-lever, a rock-arm held upon said supporting-frame one arm of which bears against said shifting frame, a means for connecting said rock-arm with said key-lever to move the shifting frame against the action of the spring when said key-lever is depressed, a lever pivotally attached to said supporting-frame, a rod connecting one end of said lever with said shifting frame, a reciprocating bar carried upon the other end of said lever, a series of connections pivotally attached to said supporting-frame and adapted to be operated by said reciprocating bar, a guide having an opening therein, a series of indicator-bars held to move in said guide and each connected to one of said connections, a means for actuating said reciprocating bar and raising one of said indicator-bars, means for holding the latter in a raised position, and means for releasing the same and permitting it to resume its normal position.

48. In a cash-register, the combination with a supporting-frame, of a shifting frame held thereon, a spring normally holding said shifting frame in a certain definite position with reference to said supporting-frame, a key-lever, a spring normally holding said key-lever in a raised position, stops to limit the motion of said key-lever, a key held upon said key-lever, a rock-arm held upon said supporting-frame and having an arm adapted to bear against said shifting frame, a means for connecting said rock-arm with said key-lever, thus moving the shifting frame against the action of the spring when said key-lever is depressed, an upper lever pivotally attached to said supporting-frame, a depending bar connecting one end of said upper lever with said shifting frame, a reciprocating bar, on said supporting-frame, a series of connections pivotally attached to said supporting-frame and adapted to be operated by said reciprocating bar, a guide having an opening therein, a series of indicator-bars held to move in said guide and each attached to one of said connections, a means for actuating said reciprocating bar and raising one of said indicator-bars, a series of spring-actuated pawls each held to engage one of said indicator-bars, and means for disengaging said pawls and releasing the indicator-bars.

49. In a cash-register, the combination with a supporting-frame, of a shifting frame held thereon, a spring normally holding said shifting frame in a certain definite position with reference to said supporting-frame, a key-lever, a spring normally holding said key-lever in a raised position, stops to limit the motion of said key-lever, a key held upon said key-lever, a rock-arm held upon said supporting-frame one arm of which bears against said shifting frame, a means for connecting said rock-arm with said key-lever, thus moving the shifting frame against the action of the spring when said key-lever is depressed, an upper lever pivotally attached to said supporting-frame, a depending bar connecting one end of said lever with said supporting-frame, a reciprocating bar carried on said supporting-frame, a series of connections pivotally attached to said supporting-frame and adapted to be operated by said reciprocating bar, a guide having an opening therein, a series of indicator-bars held to move in said guide and each attached to one of said connections, a means for actuating said reciprocating bar and raising one of said indicator-bars, a series of spring-actuated pawls each held to engage one of said indicator-bars, a shaft held to rotate upon said guide having a cam formed therein adapted to coact with said pawls to disengage them and release the slide, and means for turning said shaft and disengaging said pawls.

50. In a cash-register, the combination with a supporting-frame, of a shifting frame held thereon, a spring normally holding said shifting frame in a certain definite position with reference to said supporting-frame, a key-lever, a spring normally holding said key-lever in a raised position, stops to limit the motion of said key-lever, a key held upon said key-lever, a rock-arm held upon said supporting-frame one arm of which bears against said shifting frame, a means for connecting said rock-arm with said key-lever, thus moving the shifting frame against the action of the spring when said key-lever is depressed, an upper lever pivotally attached to said supporting-frame, a depending bar connecting one end of said lever with said shifting frame, a reciprocating bar carried on the said supporting-frame, a series of connections pivotally attached to said supporting-frame and adapted to be operated by said reciprocating bar, a guide having an opening therein, a series of indicator-bars held to move in said guide and each connected to one of said connections, a means for actuating said reciprocating bar and raising one of said indicator-bars, a series of spring-actuated pawls each held to engage one of said indicator-bars, a shaft held to rotate beneath said pawls having a cam formed therein adapted to disengage said pawls when the shaft is rotated, a spring adapted to hold said cam clear of said pawls, and means for rotating the shaft against the action of said spring.

51. In a cash-register, the combination with a supporting-frame, of a shifting frame held thereon, a spring normally holding said shifting frame in a certain definite position with reference to said supporting-frame, a key-lever, a spring normally holding said key-lever in a raised position, stops to limit the motion of said key-lever, a key held upon said key-lever, a rock-arm held upon said supporting-frame one arm of which bears against said shifting frame, a means for connecting said rock-arm with said key-lever thus moving the shifting frame against the action of the spring when said key-lever is depressed, a bell-crank lever carried by said shifting frame, a rock-shaft on the shifting frame, a rod connecting one end of said bell-crank lever with said rock-shaft, a reciprocating bar connected to said bell-crank lever, a series of connections pivotally attached to said supporting-frame and adapted to be operated by said reciprocating bar, a guide having an opening therein, a series of indicator-bars held to move in said guide and each attached to one of said connections, a series of spring-actuated pawls each held to engage one of said indicator-bars, a shaft held to rotate beneath said pawls having a cam formed upon said shaft adapted to disengage said pawls when the shaft is rotated, a spring adapted to hold said cam clear of said pawls, an arm connected to said shaft, means for connecting said arm to said key-lever, and a second set of digit key-levers.

52. In a cash-register, the combination with a supporting-frame, of a shifting frame held thereon, a spring normally holding said shifting frame in a certain definite position with reference to said supporting-frame, a key-lever, a spring normally holding said key-lever in a raised position, stops to limit the motion of said key-lever, a key held upon said key-lever, a rock-arm held upon said supporting-frame one arm of which bears against said shifting frame, a rock-shaft on said shifting frame, a means for connecting said rock-shaft with said key-lever thus moving the shifting frame against the action of the spring when said key-lever is depressed, an upper lever pivotally attached to said supporting-frame, a rod connecting one end of said upper lever with said shifting frame, a bell-crank lever on said shifting frame, a reciprocating bar connected to said bell-crank lever, a series of connections pivotally attached to said supporting-frame and adapted to be operated by said reciprocating bar, a guide having an opening therein, a series of indicator-bars held to move in said guide and each connected to one of said connections, a means on said reciprocating bar for individually engaging one of said connections and raising one of said indicator-bars, a series of spring-actuated pawls each held to engage said indicator-bars, a shaft held to rotate beneath said pawls having a cam formed thereon adapted to disengage said pawls when the shaft is rotated, a spring adapted to hold said cam clear of said pawls, an arm connected to said shaft, a lever pivoted to said frame, a rod connecting said latter lever to the shaft for operating the pawls, and a guide carried by said latter lever adapted to receive one arm of the aforesaid rock-arm thus operating the cam-shaft, disengaging the pawls and releasing the indicator-bars when said key-lever is depressed.

53. In a cash-register, the combination with a supporting-frame, of a shifting frame attached thereto, a spring attached to said shifting frame and said supporting-frame normally holding said shifting frame in a certain definite position with reference to said supporting-frame, a series of key-levers pivotally attached to said supporting-frame, a series of springs each adapted to hold said key-levers in a raised position, a stop to limit the upward motion of said key-levers, adjustable stops adapted to limit the downward motion of said key-levers, a rock-arm held to rotate upon said supporting-frame, one end of which is adapted to bear against said shifting frame, a series of hooks attached to part of said key-levers adapted to coact with the other end of said rock-arm, bearing-plates held upon said shifting frame and said supporting-frame, a wedge adapted to be automatically placed between said bearing-plates when said shifting frame is displaced by the action of said rock-arm, an upper lever pivotally attached to said supporting-frame, a bar connecting one end of said upper lever with said shifting frame, a series of connections supported upon said supporting-frame, a reciprocating bar held to be moved by the shifting frame, a guide mounted upon said supporting-frame having an opening therethrough, a series of indicator-bars having numerals impressed thereon held to move in said guide and adapted to display one of said numerals at the opening therein and also provided with ratchet-teeth, means to connect said indicator-plates with said connections, means to hold said indicator-bars in position in the guide, and means to release the same and permit them to resume their normal position.

54. In a cash-register, the combination with a supporting-frame, of a shifting frame attached thereto, a spring attached to said shifting frame and said supporting-frame normally holding said shifting frame in a certain definite position with reference to said supporting-frame, a series of key-levers pivotally attached to said supporting-frame, a series of springs adapted to hold said key-levers in raised position, a stop to limit the upward motion of said key-levers, adjustable stops adapted to limit the downward motion of said key-levers, a rock-arm held to rotate upon said supporting-frame, one end of which is adapted to bear against said shifting frame, a series of hooks attached to part of said key-levers and adapted to coact with the other end of said rock-arm, bearing-plates held upon said shifting frame and said supporting-frame, a wedge adapted to be automatically placed between said bearing-plates when said shifting frame is displaced by the action of said rock-arm against the action of said spring, an upper lever pivotally attached to said supporting-frame, a bar connecting one end of said lever with said shifting frame, a series of connections supported upon said supporting-frame, a reciprocating bar held by said shifting frame, means for operating said reciprocating bar, a guide mounted upon said supporting-frame having an opening therethrough, a series of indicator-bars provided with numerals impressed thereon held to move in said guide and adapted to display one of said numerals at the opening therein and also having ratchet-teeth thereon, means to connect each of said indicator-bars with said connection, a series of spring-pressed pawls each adapted to coact with the ratchet-teeth formed upon said indicator-bars, a shaft held beneath said pawls having a cam portion, a spring adapted to hold said cam portion free of said pawls, an arm held to rotate said shaft and cause said cam portion to disengage said pawls from said rack-bars, and means to connect said arms with the said rock-arm thus causing the indicator-bars to be released when another portion of said series of keys is depressed.

55. In a cash-register, the combination with a platen, of a strip of paper held thereon, means to move said strip of paper, a transversely-shiftable frame carrying a longitudinally-sliding type-bar bearing a series of numerals longitudinally disposed thereon located under said platen, a series of key-levers each having impressed thereon a numeral corresponding to one of the numerals upon said type-bar, means for connecting said type-bar independently to each of said key-levers and adapted to cause the numeral impressed upon said key-lever to be brought beneath the platen, and means for elevating and causing the front part of said type-bar to strike against the platen when said numeral is in position.

56. In a cash-register, the combination with a supporting-frame, of a platen, a strip of paper held to move thereon, means for moving said strip of paper upon said platen, a type-bar adapted to be longitudinally reciprocated beneath said platen, type longitudinally disposed upon said type-bar, a supporting-frame, a series of key-levers mounted upon said frame, a series of springs each adapted to hold one of said key-levers in a raised position, a stop adapted to limit the upward motion of said key-levers, a series of adjustable stops each adapted to limit the downward motion of one of said key-levers, keys each attached to said key-levers and provided with numerals impressed thereon each corresponding to one of said numerals upon said type-bar, an upper lever extending above said key-levers, wires adjustably attached to said key-levers having projections on the ends thereof, guides upon said upper lever adapted to permit the movement of said wires independently of said lever, a shifting frame, a rock-shaft mounted upon said shifting frame, a depending bar connecting said rock-shaft with said upper lever and adapted to rotate said rock-shaft when said lever is depressed, a spring normally holding said rock-shaft in its normal position, a rocker-arm held upon said rock-shaft, and means for connecting said rocker-arm to said type-bar thus causing the same to be reciprocated a certain definite distance relatively to the key-lever depressed.

57. In a cash-register, the combination with a platen, of a strip of paper held to move thereon, means for moving said strip of paper upon said platen, a type-bar adapted to be longitudinally reciprocated beneath said platen, type longitudinally disposed upon said type-bar, a supporting-frame, a series of key-levers mounted upon said frame, a series of springs each adapted to hold one of said key-levers in a raised position, a stop adapted to limit the upward motion of said key-levers, a series of adjustable stops each adapted to limit the downward motion of one of said key-levers, keys each attached to one of said key-levers and provided with numerals thereon each corresponding to one of said numerals upon said type-bar, an upper lever extending above said key-levers, wires adjustably attached to said key-levers and having projections on the ends thereof, guides upon said upper lever adapted to permit the movement of said wires independently of said lever, a shifting frame, a rock-shaft mounted upon said shifting frame, a depending bar connecting said rock-shaft to said upper lever adapted to rotate said rock-shaft when said lever is depressed, a spring normally holding said rock-shaft in its normal position, a rocker-arm held upon said rock-shaft, means for connecting said rocker-arm to said type-bar, and means for reciprocating said rocker-arm laterally of said platen.

58. In a cash-register, the combination with a platen, of a strip of paper held to move thereon, means for moving said strip of paper upon said platen, a type-bar adapted to be longitudinally reciprocated beneath said platen, type longitudinally disposed upon said type-bar, a supporting-frame, a series of key-levers mounted upon said frame, a series of springs each adapted to hold one of said key-levers in a raised position, a stop adapted to limit the upward motion of said key-levers, a series of adjustable stops each adapted to limit the downward motion of one of said key-levers, keys each attached to one of said key-levers and provided with numerals impressed thereon each corresponding to one of said numerals upon said type-bar, an upper lever extending above said key-levers, wires adjustably attached to said key-levers having projections on the ends thereof, guides upon said upper lever adapted to permit the movement of said wires independently of said lever, a shifting frame carrying said type-bar, a rock-shaft mounted upon said shifting frame, a depending bar connecting said rock-shaft to said upper lever and adapted to rotate said rock-shaft when said lever is depressed, a rocker-arm held upon said rock-shaft, and a spring-actuated latch-bar for causing said type-bar to strike against said platen.

59. In a cash-register, the combination with a platen, of a strip of paper held to move thereon, means for moving said strip of paper upon said platen, a type-bar adapted to be longitudinally reciprocated beneath said platen, type longitudinally disposed upon said type-bar, a supporting-frame, a series of key-levers mounted upon said frame, a series of springs each adapted to hold one of said key-levers in a raised position, a stop to limit the upward motion of said key-levers, a series of adjustable stops each adapted to limit the downward motion of one of said key-levers, keys each attached to one of said key-levers and provided with numerals impressed thereon each corresponding to one of said numerals upon said type-bar, an upper lever extending above said key-levers, wires adjustably attached to said key-levers having projections upon the ends thereof, guides upon said upper lever adapted to permit movement of said rods independently of said lever, a rock-shaft mounted upon said frame, a connection between said rock-shaft and said lever adapted to rotate said rock-shaft when said lever is depressed, a spring normally holding said lever in its raised position, a rocker-arm held upon said rock-shaft, a latch-bar attached to said frame held beneath said type-bar, a spring attached to said latch-bar adapted to raise the same, an adjusting-lever to which said spring latch-bar is attached, and means to release said latch upon the depression of any one of said key-levers.

60. In a cash-register, the combination with a platen, of a strip of paper held to move thereon, means for moving said strip of paper upon said platen, a type-bar adapted to be longitudinally reciprocated beneath said platen, type longitudinally disposed upon said type-bar, a supporting-frame, a series of key-levers mounted upon said frame, a series of springs each adapted to hold one of said key-levers in a raised position, a stop to limit the upward motion of said key-levers, a series of adjustable stops each adapted to limit the downward motion of one of said key-levers, keys each attached to one of said key-levers and provided with numerals impressed thereon each corresponding to one of said numerals upon said type-bar, an upper lever extending above said key-levers, wires adjustably attached to said key-levers having projections on the ends thereof, guides upon said upper lever in which said wires loosely move, a shifting frame supporting the type-bar and carrying a rock-shaft, a second rock-shaft mounted upon said supporting-frame, a depending bar connecting said rock-shaft on the shifting frame to said upper lever adapted to rotate said rock-shaft when said lever is depressed, a spring normally holding said rock-shaft on the shifting frame and said upper lever in normal position, a rocker-arm held upon said rock-shaft on the shifting frame, a latch-bar attached to said supporting-frame beneath said type-bar, a spring attached to said latch-bar adapted to raise the same, a keeper normally holding said latch-bar in its downward position, a rock-shaft held to rotate above said key-levers, a series of short wires each adjustably engaging said rock-shaft on the supporting-frame, a series of guides on said last-named rock-shaft, and a rocker-arm attached to said rock-shaft on the supporting-frame to withdraw the keeper from the latch-bar and permit the said latch-bar to elevate.

61. In a cash-register, the combination with a supporting-frame, of a platen, a strip of paper held to move upon said platen, means for moving said strip of paper, a pivotally-mounted type-bar adapted to reciprocate longitudinally beneath said platen, an elevating-arm held beneath said type-bar and having a roller carried thereon, a latch-bar held beneath the elevating-arm, a spring normally urging said latch-bar to rise, a hook adapted to limit the upward motion of said latch-bar so that when said type-bar is extended beneath said platen the same will be clear thereof, a keeper to said latch-bar in its downward position, a series of type longitudinally disposed upon said type-bar, an inking-roller held to contact with said type when said type-bar is reciprocated, a series of key-levers mounted upon said frame each having impressed thereon a character corresponding to one of the type upon said type-bar, a means for connecting said bar independently with each of said keys and causing the same to bring the type corresponding with the character impressed upon said key beneath the platen, and a means for automatically releasing said keeper on the latch-bar when said type-bar is in the desired position thus causing said type-bar to be thrown upward on its pivot and strike against the paper on the platen.

62. In a cash-register, the combination with a supporting-frame, of a platen, a strip of paper held to move upon said platen, means for moving said strip of paper, a pivotally-mounted type-bar adapted to reciprocate longitudinally beneath said platen, an elevating-arm held beneath said type-bar and having a roller carried thereon, a latch-bar held beneath the elevating-arm, a spring normally urging said latch-bar to rise, a hook adapted to limit the upward motion of said latch-bar so that when said type-bar is extended beneath said platen the same will be clear thereof, a keeper normally holding said latch-bar in its downward position, a series of type longitudinally disposed upon said type-bar, an inking-roller held to contact with said type when said type-bar is reciprocated, a series of key-levers mounted upon said frame each having impressed thereon a character corresponding to one of the type upon said type-bar, a means for connecting said type-bar independently with each of said keys and causing the same to bring the type corresponding with the character impressed upon said key beneath the platen, a rock-shaft held to rotate above said key-levers, a rocker-arm connecting said rock-shaft with said keeper, and means for turning said rock-shaft when said key-levers are depressed.

63. In a cash-register, the combination with a supporting-frame, of a platen, a strip of paper held to move upon said platen, means for moving said strip of paper, a pivotally-mounted type-bar adapted to reciprocate longitudinally beneath said platen, a pivotally-mounted elevating-arm held beneath said type-bar and having a roller carried thereby, a latch-bar held beneath the elevating-arm, a spring normally urging said latch-bar to rise, a limiting device regulating the upward motion of said latch-bar so that when said type-bar is extended beneath said platen the same will be clear thereof, a keeper normally holding said latch-bar in its downward position, a series of type longitudinally disposed upon said type-bar, an inking-roller held to contact with said type when said type-bar is reciprocated, a series of key-levers mounted upon said frame each having impressed thereon a character corresponding to one of the type upon said type-bar, a means for connecting said type-bar independently with each of said key-levers and causing the same to bring the type corresponding with the character designating said key-levers beneath the platen, a rock-shaft held to rotate above said key-levers, a rocker-arm connecting said rock-shaft with said keeper, wires adjustably connected to said key-levers and having upper angular ends, guides held upon said rock-shaft each receiving one of said wires and adapted to be engaged by said angular ends, and means for continuously holding the keeper out of engagement with the latch-bar.

64. In a cash-register, the combination with a supporting-frame, of a platen, a strip of paper held to move upon said platen, means for moving said strip of paper, a pivotally-mounted type-bar adapted to reciprocate longitudinally beneath said platen, an elevating-arm pivotally mounted beneath said type-bar and having a roller thereon, a latch-bar held beneath the said elevating-arm, a spring normally urging said latch-bar to rise, a limiting device for said latch-bar so that when said type-bar is extended beneath said platen the same will be clear thereof, a keeper for normally holding said latch-bar in its downward position, a series of type longitudinally disposed upon said type-bar, an inking-roller held to rub against said type when said type-bar is reciprocated, a series of key-levers mounted upon said frame each having impressed thereon a character corresponding to one of the type upon said type-bar, a means for connecting said bar independently with each of said keys and causing the same to bring the type corresponding with the character impressed upon said key beneath the platen, a rock-shaft held to rotate above said key-levers, a rocker carried by said rock-shaft and having a keeper thereon, wires each adjustably connected to one of said keys, guides held upon said rock-shaft each receiving one of said wires, a hook being formed upon each of said wires adapted to catch said guides when said key-lever has been depressed and said type-bar moved so that the type thereon corresponding with the character upon the key-lever has been brought beneath said platen, an adjusting-lever mounted upon said frame having a projection formed on a rod extending from said rock-shaft adapted to coact with said projection and turn the rock-shaft and withdraw said keeper when said adjusting-lever is moved, and means to hold said lever in position.

65. In a cash-register, the combination with a supporting-frame, of a platen, a strip of paper held to move upon said platen, means for moving said strip of paper, a pivotally-mounted type-bar adapted to reciprocate longitudinally beneath said platen, an elevating-lever held beneath said type-bar and having a roller carried thereon, a latch-bar held beneath the said elevating-lever and having a raising-spring attached thereto, a limiting device for said latch-bar so that when said type-bar is extended beneath said platen the same will be clear thereof, a keeper normally holding said latch-bar in its downward position, a series of type longitudinally disposed upon said type-bar, an inking-roller held to rub against said type when said type-bar is reciprocated, a series of key-levers mounted upon said frame each having impressed thereon a character corresponding to one of the type upon said type-bar, a means for connecting said type-bar independently with each of said keys and causing the same to bring the type corresponding with the character impressed upon said key beneath the platen, a rock-shaft held to rotate above said key-levers, a rocker-arm on said rock-shaft and carrying said keeper, wires each adjustably connected to one of said keys and having angularly-disposed ends, guides held upon said rock-shaft each receiving one of said wires, an adjusting-lever mounted upon said frame having a projection formed thereon, a rod extending from said rock-shaft adapted to coact with said projection and turn the rock-shaft and withdraw said keeper from the latch-bar when said lever is moved, means to hold said adjusting-lever in position, and means to transversely adjust said type-bar.

66. In a cash-register, the combination with a supporting-frame, of a shifting frame supported thereon a spring normally holding said shifting frame in a certain definite position with reference to said supporting-frame, means for moving said shifting frame against the action of said spring, a stationary platen held upon said supporting-frame above the shifting frame, a type-bar held upon said shifting frame adapted to be reciprocated beneath said platen in a plane at a right angle to the movement of said latter frame, a series of type held upon said type-bar longitudinally disposed thereon, an inking-roller adapted to rub against the face of said type when said bar is reciprocated, and means for causing said type-bar to strike against said platen when in the desired position.

67. In a cash-register, the combination with a supporting-frame, of a platen mounted thereon, of a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position with reference to said platen, a means to move said shifting frame against the action of said spring and thus shift the position of the type-bar with respect to the platen, and means to move said type-bar longitudinally and thus causing one of said type to be held beneath said platen.

68. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position with reference to said platen, a means to move said shifting frame against the action of said spring and thus shift the position of the type-bar with respect to the platen, means to move said type-bar longitudinally of said platen thus causing one of said type to be held beneath said platen, and means to cause said type-bar to strike against said platen.

69. In a cash-register, the combination with a supporting-frame, of a platen mounted thereon, of a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position with reference to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, and means for independently connecting any of said levers with said type-bar.

70. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position relatively to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, keys each held upon one of said key-levers bearing a character corresponding to one of said type impressed thereon, means for independently connecting any one of said levers with said type-bar and causing the character corresponding to the character upon the lever to be brought beneath the platen, and means for causing the same to be lifted when in this position and strike the platen, substantially as described.

71. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position with reference to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, an upper lever, pivotally attached to said supporting-frame, a series of adjustable connecting-wires extending from said upper lever to each of said keys, means to permit said wires to slide freely in an upward direction through the connections on said upper lever, means to prevent the downward motion of any one of said connecting-wires when said lever is in its raised position, a spring normally holding said lever in its raised position, a rock-shaft held to rotate upon said shifting frame, a depending bar connecting said rock-shaft with said cross-lever, means to connect said rock-shaft with said type-bar, thus causing the same to move beneath said platen when any one of said keys is depressed, and means adapted to lift said type-bar and cause the type to strike against the platen when the same is moved into position by the depression of said key-lever.

72. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position with reference to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, an upper lever pivotally attached to said supporting-frame, a series of adjustable connecting-wires extending from said upper lever to each of said keys, means to permit said wires to slide freely in an upward direction through the connections on said upper lever, means to prevent the downward motion of any one of said connecting-wires when said lever is in its raised position, a spring normally holding said lever in its raised position, a rock-shaft held to rotate upon said shifting frame, a depending bar connecting said rock-shaft with said upper lever, means to connect said rock-shaft with said type-bar, thus causing the same to move beneath said platen when any one of said keys is depressed, a latch-bar pivoted to said supporting-frame held beneath said type-bar, a spring normally urging said latch-bar to rise, an upper limiting device for said latch-bar, a keeper adapted to hold said latch-bar downward, and means to disengage said latch-bar when said type-bar is in the desired position.

73. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position relatively to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, an upper lever pivotally attached to said supporting-frame, a series of adjustable connecting-wires extending from said upper lever to each of said keys, means to permit said wires to slide freely in an upward direction through the connections on said upper lever, means to prevent the downward motion of any one of said connecting-wires when said lever is in its raised position, a spring normally holding said lever in its raised position, a rock-shaft held to rotate upon said shifting frame, a depending bar connecting said rock-shaft with said upper lever, means to connect said rock-shaft with said type-bar, thus causing the same to move beneath said platen when any one of said keys is depressed, a latch-bar pivoted to said supporting-frame held beneath said type-bar, a spring normally urging said latch-bar to rise, an upper limiting device for said latch-bar, a keeper adapted to hold said latch-bar downward, a rock-shaft held to rotate above said key-levers, having a rocker-arm connected to said keeper, and means for automatically rotating said rock-shaft when any one of said key-levers is depressed.

74. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position relatively to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, an upper lever pivotally attached to said supporting-frame, a series of adjustable connecting-wires extending from said upper lever to each of said keys, means to permit said wires to slide freely in an upward direction through the connections on said upper lever, means to prevent the downward motion of any one of said connecting-wires when said lever is in its raised position, a spring normally holding said lever in its raised position, a rock-shaft held to rotate upon said shifting frame, a depending bar connecting said rock-shaft with said upper lever, means to connect said rock-shaft with said type-bar, thus causing the same to move beneath said platen when any one of said keys is depressed, a latch-bar pivoted to said supporting-frame held beneath said type-bar, a spring normally urging said latch-bar, a stop adapted to limit the upward motion of said latch-bar, a keeper adapted to hold said latch-bar downward, a rock-shaft on the supporting-frame held to rotate above said key-levers, a rocker-arm connected to said latter rock-shaft and actuating said keeper, a series of adjustable hooks each adapted to engage said latter rock-shaft and rotate the same when said key-levers are depressed, said action taking place after the type-bar has been moved to the proper position, and means for independently releasing said keeper and continuously clearing the latch-bar.

75. In a cash-register, the combination with a supporting-frame, of a platen mounted thereon, a shifting frame mounted upon said supporting-frame and adapted to move transversely of said platen, a type-bar held to move longitudinally of said platen upon said shifting frame, a series of type longitudinally disposed upon said type-bar, an inking-roller adapted to bear against said type when said type-bar is moved, a spring adapted to normally hold said shifting frame in a certain definite position with reference to said supporting-frame and thus hold said type-bar in a similar position with reference to said platen, a means to move said shifting frame against the action of said spring and thus shift the position of the type-bar with respect to the platen, a series of key-levers held upon said supporting-frame, a series of springs each adapted to hold one of said levers in a raised position, a stop to limit the upward motion of said levers, a series of adjustable stops to limit the downward motion thereof, an upper lever pivotally attached to said supporting-frame, a series of adjustable connecting-wires extending from said upper lever to each of said keys, means to permit the said wires to slide freely in an upward direction through the connections on said upper lever, means to prevent the downward motion of any one of said connecting-wires when said lever is in its raised position, a spring normally holding said lever in its raised position, a rock-shaft held to rotate upon said shifting frame, a depending bar connecting said rock-shaft with said upper lever, means to connect said rock-shaft with said type-bar, thus causing the same to move beneath said platen when any one of said keys is depressed, a latch-bar pivoted to said supporting-frame held beneath said type-bar, a spring normally urging said lever to rise, a stop adapted to limit the motion of said lever, a keeper adapted to hold said latch-bar downward against the action of said spring, a rock-shaft held on the supporting-frame to rotate above said key-levers, a rocker-arm connected to said latter rock-shaft and operating said keeper, a series of adjustable wires each adapted to engage said latter rock-shaft and rotate the same when said key-levers are depressed, said action taking place at the latter end of the stroke after the type-bar has been moved to the proper position, a lever attached to said supporting-frame, a rocker-arm attached to said rock-shaft and adapted to coact with said lever, and means to hold said lever in position when moved, substantially as described.

76. In a cash-register, the combination with a supporting-frame, of a shifting frame held thereon, a spring normally holding said shifting frame in a certain definite position with relation to said supporting-frame, a platen held upon said supporting-frame, a type-bar held upon said shifting frame adapted to be reciprocated longitudinally thereof and adapted to be adjusted transversely thereof by the motion of the supporting-frame, a rock-lever held upon said supporting-frame, one arm of which is adapted to bear against said shifting frame, a series of key-levers held upon said supporting-frame, a stop adapted to limit the upward motion of said key-levers, springs adapted to hold said key-levers in their raised position, a series of adjustable stops each adapted to limit the downward motion of one of said key-levers, a series of hooks connected to said key-levers and adapted to coact with an arm of the said rock-lever, thus turning the same and causing the shifting frame to move a certain definite distance, said distance varying with the lever depressed, means adapted to move said type-bar longitudinally of said platen and bring any desired type beneath the same, and means adapted to lift said type-bar and cause the type to strike against the platen.

77. In a cash-register, the combination with a supporting-frame, of a shifting frame held thereon, a spring normally holding said shifting frame in a certain definite position with relation to said supporting-frame, a platen held upon said supporting-frame, a type-bar held upon said shifting frame adapted to be reciprocated longitudinally thereof and adapted to be adjusted transversely thereof by the motion of the supporting-frame, a rock-lever held upon said supporting-frame, one arm of which is adapted to bear against said shifting frame, a series of key-levers held upon said supporting-frame, a stop adapted to limit the upward motion of said key-levers, springs adapted to hold said key-levers in their raised position, a series of adjustable stops each adapted to limit the downward motion of one of said key-levers, a series of hooks connected to said key-levers and adapted to coact with an arm of the said rock-lever, thus turning the same and causing the shifting frame to move a certain definite distance, said distance varying with the lever depressed, a series of type longitudinally disposed upon said type-bar, an inking-roller held to bear against said type when said bar is reciprocated, a second series of key-levers, means for independently connecting any one of said second series of key-levers to said type-bar and causing the same to move a definite distance, said distance depending upon the lever depressed, and means to lift said type-bar and cause the type to strike against the platen.

78. In a cash-register, the combination with a supporting-frame, of a shifting frame held thereon, a spring normally holding said shifting frame in a certain definite position with relation to said supporting-frame, a platen held upon said supporting-frame, a type-bar held upon said shifting frame adapted to be reciprocated longitudinally thereof and adapted to be reciprocated transversely thereof by the movement of the shifting frame, a rock-lever held upon said supporting-frame, one arm of which is adapted to bear against said shifting frame, a series of key-levers held upon said supporting-frame, a stop adapted to limit the upward motion of said key-levers, springs adapted to hold said key-levers in their raised position, a series of adjustable stops each adapted to limit the downward motion of one of said key-levers, a series of hooks carried by said key-levers and adapted to coact with an arm of the said rock-lever, thus turning the same and causing the shifting frame to move a certain definite distance, said distance varying with the lever depressed, a series of type longitudinally disposed upon said type-bar, an inking-roller held to bear against said type when said bar is reciprocated, a second series of key-levers, keys carried upon said second series of key-levers each bearing a character corresponding to one of said type impressed thereon, an upper lever supported upon said frame, wires independently connecting each of said keys to said upper lever adapted to move said lever through a definite angle, said angle being dependent upon the key depressed, a rock-shaft carried upon said shifting frame, a depending bar connecting the rock-shaft and said upper lever, a rocker-arm held upon said rock-shaft, means for connecting said rocker-arm with said type-bar, and means adapted to lift said type-bar when said key has been depressed and said bar moved to the desired position, substantially as described.

79. In a cash-register, the combination with a supporting-frame, of a shifting frame held thereon, a spring normally holding said shifting frame in a certain definite position with relation to said supporting-frame, a platen held upon said supporting-frame, a type-bar carrying type and held upon said shifting frame adapted to be reciprocated longitudinally thereof and adapted to be moved transversely by the movement of the shifting frame, a rock-lever held upon said supporting-frame, one arm of which is adapted to bear against said shifting frame, a series of key-levers held upon said supporting-frame, a stop adapted to limit the upward motion of said key-levers, springs adapted to hold said key-levers in their raised position, a series of adjustable stops each adapted to limit the downward motion of one of said key-levers, a series of hooks on said key-levers and adapted to coact with an arm of the said lever, thus turning the same and causing the shifting frame to move a certain definite distance, said distance varying with the lever depressed, an inking-roller held to bear against said type-bar when the latter is reciprocated, a second series of key-levers, keys carried upon said key-levers each bearing a character corresponding to one of said type impressed thereon, an upper lever supported upon said frame, wires independently connecting each of said second series of key-levers to said upper lever adapted to move said latter lever through a definite angle, said angle being dependent upon the key depressed, a rock-shaft carried upon said shifting frame, a spring holding said rock-shaft in its normal position, a depending bar connecting the rock-shaft and said upper lever, a rocker-arm held upon said rock-shaft, means for connecting said rocker-arm with said type-bar to cause the same to be reciprocated, a latch-bar mounted upon said supporting-frame, a spring normally urging said latch-bar upward, means to hold said latch-bar in its depressed position against the action of said spring until said type-bar shall have attained the desired position, and means to release said latch-bar and permit its spring to act when the said type-bar is in position to print.

80. In a cash-register, the combination with a supporting-frame, of a shifting frame held thereon, a spring normally holding said shifting frame in a certain definite position with relation to said supporting-frame, a platen held upon said supporting-frame, a type-bar held upon said shifting frame adapted to be reciprocated longitudinally thereof, and adapted to be moved transversely by the adjustment of the shifting frame, a rock-lever held upon said supporting-frame, one arm of which is adapted to bear against said shifting frame, a series of key-levers held upon said supporting-frame, a stop adapted to limit the upward motion of said key-levers, springs adapted to hold said key-levers in their raised position, a series of adjustable stops each adapted to limit the downward motion of one of said key-levers, a series of hooks held on said key-levers and adapted to coact with an arm of the said bell-crank rock-lever, thus turning the same and causing the shifting frame to move a certain definite distance, said distance varying with the lever depressed, an inking-roller held to bear against said type-bar when said bar is reciprocated, a second series of key-levers, keys carried upon said key-levers each bearing a character corresponding to one of said type impressed thereon, an upper lever supported upon said frame, wires independently connecting each of said second series of key-levers to said upper lever adapted to move said latter lever through a definite angle, said angle being dependent upon the key depressed, a rock-shaft carried upon said shifting frame, a spring holding said rock-shaft and upper lever in normal position, a depending bar connecting the rock-shaft and said upper lever, a rocker-arm held upon said rock-shaft, means for connecting said rocker-arm with said type-bar to cause the same to be reciprocated, a latch-bar mounted upon said supporting-frame, a spring normally urging said latch-bar upward, a keeper normally holding said latch-bar in its depressed position, a rock-shaft on the supporting-frame held to rotate above said second set of key-levers, a rocker-arm attached to said latter shaft and connected to said keeper, and means for automatically rotating said last-named shaft.

81. In a cash-register, the combination with a supporting-frame, of a shifting frame held thereon having a spring to hold it, in a certain definite position with relation to said supporting-frame, a platen held upon said supporting-frame, a type-bar having a series of longitudinally-disposed type and mounted on said shifting frame, said bar being adapted to be reciprocated longitudinally thereof and adjusted transversely by the movement of the shifting frame, a rock-arm upon said supporting-frame having one arm adapted to bear against said shifting frame, a series of normally-elevated spring-engaged key-levers on said supporting-frame, a stop adapted to limit the upward motion of said key-levers, a series of adjustable stops adapted to limit the downward motion of said key-levers, a series of hooks held on said key-levers and adapted to coact with an arm of the said rock-lever thus turning the same and causing the shifting frame to move, said movement varying with the lever depressed, an inking-roller held to bear against said type when said type-bar is reciprocated, a second series of key-levers each carrying a character corresponding to one of said type impressed thereon, an upper lever supported upon said frame, wires independently connecting each of said keys to said upper lever to move the latter through a definite angle, dependent upon the key depressed, a rock-shaft carried upon said shifting frame having a spring attached thereto, a depending bar connecting the rock-shaft and said upper lever, a rocker-arm held upon said rock-shaft, means for connecting said rocker-arm with said type-bar to cause the same to be reciprocated, a latch-bar mounted upon said supporting-frame and having a spring attached thereto, normally urging the same upward, an elevating-arm carried by said shifting frame having a roller held on the front end of the same beneath said type-bar, a transversely-positioned roller held beneath said elevating-arm, a latch normally holding said lever in its depressed position, a rock-shaft on the supporting-frame having a keeper on one end to hold the said latch-bar depressed, and a rod on the opposite end, an adjusting-lever attached to said supporting-frame having a stop engaged by said rod on the last-named rock-shaft, and means to hold said adjusting-lever in position.

82. In a cash-register, an adding mechanism comprising a guide having an opening in the side thereof, a series of indicator-bars held to move within said guide and provided with numerals impressed thereon, a series of key-levers each provided with a numeral impressed thereon and a series of ratchet-wheels for operating said indicator-bars, a sliding carriage carrying a pawl to operate one of said ratchet-wheels, and means to connect said carriage and said key-levers and cause the same to move said bars.

83. In a cash-register, an indicator comprising a guide, a series of bars each having the numerals from "0" to "9" impressed thereon, movable longitudinally of the guide, said bars automatically resuming the position of "0" immediately upon the position of "9" having been passed, and any one of said bars being adapted to move the bar to the left thereof upward one figure when said bar has passed the position of "9," a series of key-levers, ratchet-wheels for operating said bars, and means for connecting said ratchet-wheels and key-levers.

84. In a cash-register, the combination with a supporting-frame, of a spindle mounted thereon, a series of ratchet-wheels each provided with a number of teeth exactly divisible by ten, pins upon the face of said ratchets opposite every tenth tooth, a series of spring-pressed levers held to move adjacent to said ratchet-wheels, pawls carried upon each of said levers each adapted to engage one of said ratchet-wheels, an arm extending from each of said levers, a stop adapted to limit the motion of said levers, said lever, pawl, and stop being so arranged with reference to said ratchet-wheels that when the pin upon one of said ratchet-wheels strikes said extended arm the pawl upon said lever will cause the adjacent ratchet-wheel to move forward the space of one tooth when said arm will be released and said lever resume its normal position, means to rotate any one of said ratchet-wheels, and means to register the motion thereof.

85. In a cash-register, the combination with a supporting-frame, of a series of counting-wheels held thereon, pins projecting from said counting-wheels, a guide having an opening therethrough, a series of indicator-bars having numerals impressed thereon equal in number to said counting-wheels, a series of levers each attached to one of said indicator-bars and provided with an extended end adapted to be engaged and raised by said pins, and means for rotating one of said wheels.

86. In a cash-register, the combination with a supporting-frame having a guide thereon, of counting-wheels carried thereon having a successive rotation imparted thereto by the operation of one of said wheels, a series of indicator-bars movable in said guide and having numerals impressed thereon equal in number to said counting-wheels, a series of key-levers held upon said supporting-frame, and means for independently connecting any one of said key-levers with one of said counting-wheels to rotate the same.

87. In a cash-register, the combination with a supporting-frame, of counting-wheels carried thereon, means for registering the motion of said counting-wheels, a series of key-levers held upon said supporting-frame, an upper lever held upon said frame, means for connecting said key-levers to said upper lever and adapted to permit the independent movement of any one of said key-levers and said upper lever, a rock-shaft held to rotate upon said frame, a rocker-arm extending from said rock-shaft, a bar connecting said upper lever with said rock-shaft, a guide held adjacent to said counting-wheels, a carriage moving upon said guide, a rod connecting said rocker-arm to said carriage and operating the latter upon the movement of the rock-shaft, a pawl held upon said carriage adapted to engage one of said ratchet-wheels and rotate the same when said rock-shaft is moved in one direction and adapted to slide freely thereunder when said rock-shaft is moved in the opposite direction, and means for limiting the motion of said key-levers.

88. In a cash-register, the combination with a supporting-frame, of counting-wheels carried thereon, means for registering the motion of said counting-wheels, a series of key-levers held upon said supporting-frame, springs adapted to hold said levers in a raised position, a stop to limit the upward motion of said levers, a series of stops each adapted to limit the downward motion of one of said levers, keys held upon said levers each bearing a numeral impressed thereon, an upper lever attached to said frame, a series of adjustable wires adapted to independently connect any one of said keys to said cross-lever, a rock-shaft actuated by said upper lever, a ratchet-bar adapted to coact with said counting-wheels connected to said rock-shaft and give one of said counting-wheels a definite motion, the extent of said motion being indicated by the numeral impressed upon the key, and a spring adapted to normally hold said upper lever in a raised position.

89. In a cash-register, the combination with a supporting-frame, of counting-wheels carried thereon, means for registering the motion of said counting-wheels, a series of key-levers held upon said supporting-frame, springs adapted to hold said levers in a raised position, a stop to limit the upward motion of said levers, a series of stops each adapted to limit the downward motion of one of said levers, keys held upon said levers each bearing a numeral impressed thereon, an upper lever attached to said frame, a series of adjustable wires adapted to independently connect any one of said keys to said upper lever, a rock-shaft actuated by said upper lever, a pawl adapted to coact with said counting-wheels connected to said rock-shaft and give one of said counting-wheels a definite motion, the extent of said motion being indicated by the numeral impressed upon the key, a spring adapted to normally hold said upper lever in a raised position, and means for independently throwing said pawl out of engagement with said counting-wheels and permitting the same to be moved without moving said counting-wheels.

90. In a cash-register the combination with a supporting-frame, of a series of counting-wheels provided with ratchet-teeth thereon, a shifting frame mounted upon said supporting-frame, a spring normally holding said shifting frame in a certain definite position with relation to said supporting-frame, means for moving said shifting frame against the action of said spring, guides held upon said shifting frame, a carriage moving upon said guides adjacent to said ratchet-wheels, a pawl adapted to engage one of said ratchet-wheels held upon said carriage, means for reciprocating said carriage and turning said ratchet-wheels, and means for registering the amount of said motion.

91. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, means for moving said shifting frame against the action of said spring, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, and means for connecting said carriage and said levers adapted to reciprocate the same.

92. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, means for moving said shifting frame against the action of said spring, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, an upper lever mounted upon said supporting-frame, wires connecting each of said key-levers with said upper lever each adapted to move said upper lever independently of the remaining key-lever, a rock-shaft actuated by said upper lever and rotated a certain definite amount dependent upon the key-lever, a bar connecting said carriage with said rock-shaft thus adapting said pawl to move said counting-wheel to a space dependent upon and indicated by the numeral upon said key-lever, and means for registering the amount of said motion.

93. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, means for moving said shifting frame against the action of said spring, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, an upper lever mounted upon said supporting-frame, individual devices connecting each of said key-levers with said upper lever each adapted to move said latter lever independently of the remaining key-levers, a rock-shaft actuated by said upper lever and rotated a certain definite distance dependent upon the key-lever, a depending rod connecting said carriage with said rock-shaft thus adapting said pawl to move said counting-wheel to a space dependent upon and indicated by the numeral upon said key-lever, a guide on the supporting-frame having an opening in the side thereof, a series of indicator-bars held to move within said guide and each provided with a series of numerals impressed thereon and corresponding to the numerals upon the key-lever, pins projecting from said counting-wheels, and levers held to coact with said pins connected to said indicator-bars.

94. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame, one arm of which bears against said shifting frame, a series of key-levers held to independently move said rock-lever, the amount of motion varying with the key-lever depressed, guides held upon said shifting frame, a carriage moving upon said guides adjacent to said ratchet-wheels, a pawl adapted to engage one of said ratchet-wheels held upon said carriage, means for reciprocating said carriage and turning said ratchet-wheels, and means for registering the amount of said motion.

95. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame, one arm of which bears against said shifting frame, a series of key-levers held to independently move said rock-lever, the amount of movement varying with the key-lever depressed, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, and means for connecting said carriage and said levers adapted to reciprocate the same.

96. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame one arm of which bears against said shifting frame, a series of key-levers held to independently move said rock-lever, the amount of movement varying with the key depressed, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, an upper lever mounted upon said supporting-frame, individual devices connecting each of said key-levers with said upper lever each adapted to move said latter lever independently of the remaining key-levers, a rock-shaft actuated by said upper lever and rotated a certain definite amount dependent upon the key-lever, a rod connecting said carriage with said rock-shaft thus adapting said pawl to move said counting-wheel an amount dependent upon and indicated by the numeral upon said key-lever, and means for registering the amount of said motion.

97. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame one arm of which bears against said shifting frame, a series of key-levers held to independently move said rock-lever, the amount of movement varying with the key-lever depressed, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, an upper lever mounted upon said supporting-frame, rods connecting each of said key-levers with said upper lever each adapted to move said latter independently of the remaining key-levers, a rock-shaft actuated by said upper lever and rotated a certain definite amount dependent upon the key-lever, a rod connecting said carriage with said rock-shaft thus adapting said pawl to move said counting-wheel an amount dependent upon and indicated by the numeral upon said key-lever, a guide having an opening in the side thereof, a series of indicator-bars held to move within said guide and each provided with a series of numerals impressed thereon corresponding to the numerals upon the key-lever, pins projecting from said counting-wheels, and levers held to coact with said pins connected to said indicator-bars.

98. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame, one arm of which bears against said shifting frame, a series of key-levers held to independently move said rock-lever, the amount of movement varying with the key-lever depressed, means to hold said shifting frame in position when so moved, means to release the same, guides held upon said shifting frame, a carriage moving upon said guides adjacent to said ratchet-wheels, a pawl adapted to engage one of said ratchet-wheels held upon said carriage, means for reciprocating said carriage and turning said ratchet-wheels, and means for registering the amount of said motion.

99. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a lever held upon said frame one arm of which bears against said shifting frame, a series of key-levers held to independently move said rock-lever the amount of movement varying with the key-lever depressed, means to hold said shifting frame in position when so moved, means to release the same, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, and means for connecting said carriage and said levers adapted to reciprocate the same.

100. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame one arm of which bears against said shifting frame, a series of key-levers held to independently move said rock-lever the amount of movement varying with the key-lever depressed, means to hold said shifting frame in position when so moved, means to release the same, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, an upper lever mounted upon said supporting-frame, rods connecting each of said key-levers with said upper lever each adapted to move said latter lever independently of the remaining key-levers, a rock-shaft actuated by said upper lever and rotated a certain definite amount dependent upon the key-lever, a rod connecting said carriage with said rock-shaft thus adapting said pawl to move said counting-wheel to a space dependent upon and indicated by the numeral upon said key-lever, and means for registering the amount of said motion.

101. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame one arm of which bears against said shifting frame, a series of key-levers held to independently move said rock-lever the amount of movement varying with the key-lever depressed, means to hold said shifting frame in position when so moved, means to release the same, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, an upper lever mounted upon said supporting-frame, rods connecting each of said key-levers with said upper lever each adapted to move said latter lever independently of the remaining key-levers, a rock-shaft actuated by said upper lever and rotated a certain definite amount dependent upon the key-levers, a rod connecting said carriage with said rock-shaft thus adapting said pawl to move said counting-wheel to a space dependent upon and indicated by the numeral upon said key-lever, a guide having an opening in the side thereof, a series of indicator-bars held to move within said guide and each provided with a series of numerals impressed thereon corresponding to the numerals upon the key-lever, pins projecting from said counting-wheels, and levers held to coact with said pins connected to said indicator-bars.

102. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame, one arm of which bears against said shifting frame, a series of key-levers held to independently move said rock-lever, the amount of movement varying with the key-lever depressed, a catch-plate held on said supporting-frame, guides held on the shifting frame, a toothed wedge adapted to drop between said catch-plate and said guides and having a step-by-step operation, the teeth upon one side of said wedge being in the form of steps and upon the other side thereof being in the form of ratchet-teeth, other guides held upon the opposite side of said shifting frame, a carriage moving upon said latter guides adjacent to said ratchet-wheels, a pawl held by said carriage and adapted to engage one of said ratchet-wheels, means for reciprocating said carriage and turning said ratchet-wheels, and means for registering the amount of said motion.

103. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame one arm of which bears against said shifting frame, a series of key-levers held to independently move said bell-crank rock-shaft, the amount of movement varying with the key-lever depressed, a catch-plate held upon one of said frames, guides held upon the remaining frame, a toothed wedge having a step-by-step operation and adapted to drop between said catch-plate and said guides, the teeth upon one side of said wedge being in the form of steps and upon the other side thereof being in the form of ratchet-teeth, guides held upon said shifting frame, a carriage moving upon said guides adjacent to said ratchet-wheels, a pawl adapted to engage one of said ratchet-wheels held upon said carriage, a series of key-levers each bearing a numeral impressed thereon, and means for connecting said carriage and said levers and adapted to reciprocate the same.

104. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame, one arm of which bears against said shifting frame, a series of key-levers held to independently move said rock-lever the amount of movement varying with the key-lever depressed, a catch-plate held on said supporting-frame, guides held on the shifting frame, a toothed wedge having a step-by-step operation and adapted to drop between said catch-plate and said guides, said wedge having teeth upon one side in the form of steps and ratchet-teeth on the other side thereof, other guides held upon said shifting frame, a carriage moving upon said latter guides adjacent to said ratchet-wheels, a pawl adapted to engage one of said ratchet-wheels held upon said carriage, a series of key-levers each bearing a numeral impressed thereon, an upper lever mounted upon said supporting-frame, rods connecting each of said key-levers with said upper lever each adapted to move said latter lever independently of the remaining key-levers, a rock-shaft actuated by said upper lever and rotated a certain definite amount dependent upon the key-lever, a rod connecting said carriage with said rock-shaft thus adapting said pawl to move said counting-wheel to a space dependent upon and indicated by the numeral upon said key-lever, and means for registering the amount of said motion.

105. In a cash-register, the combination with a supporting-frame, of a series of counting-wheels provided with ratchet-teeth thereon, a shifting frame mounted upon said supporting-frame, a spring normally holding said shifting frame in a certain definite position with relation to said supporting-frame, a rock-lever held upon said frame, one arm of which bears against said shifting frame, a series of key-levers held to independently move said rock-lever the amount of movement varying with the key-lever depressed, a catch-plate held upon said supporting-frame, guides held adjacently upon the shifting frame, a toothed wedge having a step-by-step operation and adapted to drop between said catch-plate and said guides, said wedge having teeth upon one side in the form of steps and ratchet-teeth on the other side thereof, other guides held upon the opposite side of said shifting frame, a carriage moving upon said latter guides adjacent to said ratchet-wheels, a pawl adapted to engage one of said ratchet-wheels held upon said carriage, a series of key-levers each bearing a numeral impressed thereon, an upper lever mounted upon said supporting-frame, rods connecting each of said key-levers with said upper lever each adapted to move said latter lever independently of the remaining key-levers, a rock-shaft actuated by said upper lever and rotated a certain definite amount dependent upon the key-lever, a rod connecting said carriage with said rock-shaft thus adapting said pawl to move said counting-wheel to an amount dependent upon and indicated by the numeral upon said key-lever, a guide having an opening in the side thereof, a series of indicator-bars held to move within said guide and each provided with a series of numerals impressed thereon corresponding to the numerals upon the key-lever, pins projecting from said counting-wheels, and levers held to coact with said pins connected to said indicator-bars.

106. In a cash-register, a supporting-frame, a shifting frame therein, a straight sliding type-bar carried by the latter frame and reciprocated in a plane at an angle to the movement of the shifting frame, a stationary platen above said type-bar traversed by a paper strip, key-levers for operating said shifting frame and type-bar, connections between the key-levers and shiftable frame, whereby the type-bar is moved to the desired column, and means for throwing the type-bar out of operative relation to the platen.

107. In a cash-register, in combination a guide, a series of bars movably mounted in said guide, each having numerals thereon increasing arithmetically in regular gradation from a cipher upwardly, each of said bars automatically resuming a position of zero after the highest numeral on each has been passed, a series of disks having pins to elevate said bars through suitable connections, a series of key-levers, and means actuated thereby for operating said disks.

108. In a cash-register, the combination of a supporting-frame, a shiftable frame mounted therein, a longitudinally-reciprocating vertically-movable type-bar in said shifting frame, a series of key-levers for operating said type-bar, means for receiving impressions from the type-bar, and a second series of key-levers for moving said shiftable frame.

109. In a cash-register, the combination of indicating and registering mechanism, a series of key-levers, a shifting frame carrying a type-bar operated by said key-levers, a second set of key-levers for operating said shifting frame adjustable key-posts on said second set of key-levers, and adjustable stepped stops arranged in pairs under each of said adjustable key-posts.

110. In a cash-register, the combination of indicating and registering mechanism, a series of key-levers, a shifting frame carrying a type-bar operated by said key-levers, a second set of key-levers for operating said shifting frame and provided with adjustable key-posts, stepped stops arranged in pairs under said posts, and mechanism for causing said shifting frame to have a step-by-step movement.

In testimony whereof I have signed this specification in the presence of two subscribing witnesses.

GEORGE WARREN HILL.

Witnesses:
J. G. YOUNG,
G. O. CARR.